(12) United States Patent
Park

(10) Patent No.: US 8,208,097 B2
(45) Date of Patent: Jun. 26, 2012

(54) COLOR COMPENSATION MULTI-LAYERED MEMBER FOR DISPLAY APPARATUS, OPTICAL FILTER FOR DISPLAY APPARATUS HAVING THE SAME AND DISPLAY APPARATUS HAVING THE SAME

(75) Inventor: Seong-Sik Park, Suwon-si (KR)

(73) Assignee: Samsung Corning Precision Materials Co., Ltd., Gyeongsangbuk-do (KR)

( * ) Notice: Subject to any disclaimer, the term of this patent is extended or adjusted under 35 U.S.C. 154(b) by 807 days.

(21) Appl. No.: 12/187,017

(22) Filed: Aug. 6, 2008

(65) Prior Publication Data
US 2009/0040440 A1 Feb. 12, 2009

(30) Foreign Application Priority Data

Aug. 8, 2007 (KR) .................. 10-2007-0079554
Dec. 12, 2007 (KR) .................. 10-2007-0129072

(51) Int. Cl.
*G02F 1/1335* (2006.01)
*G02B 5/28* (2006.01)
(52) U.S. Cl. ........ 349/104; 349/105; 349/137; 349/158; 359/586
(58) Field of Classification Search .................. 349/104, 349/105, 117, 118, 137, 158; 359/586, 589, 359/590, 580, 588
See application file for complete search history.

(56) References Cited

U.S. PATENT DOCUMENTS

| | | | | |
|---|---|---|---|---|
| 4,529,272 A | * | 7/1985 | Kruger et al. | 349/137 |
| 6,157,486 A | * | 12/2000 | Benson et al. | 359/487.05 |
| 6,829,026 B2 | * | 12/2004 | Sasaki et al. | 349/118 |
| 2003/0071796 A1 | | 4/2003 | Nakanishi et al. | |
| 2004/0075790 A1 | | 4/2004 | Wang | |
| 2006/0177638 A1 | * | 8/2006 | Shibuya et al. | 428/212 |
| 2006/0250064 A1 | | 11/2006 | Park et al. | |

OTHER PUBLICATIONS

Chinese Office Action, with English translation, issued in Chinese Patent Application No. 200810147331.2, mailed Sep. 18, 2009.
European Search Report issued in European Patent Application No. EP 08161979.3-2205, dated Dec. 3, 2008.

* cited by examiner

*Primary Examiner* — Dung Nguyen
*Assistant Examiner* — Tai Duong
(74) *Attorney, Agent, or Firm* — McDermott Will & Emery LLP

(57) ABSTRACT

Disclosed are a color compensation multi-layered member for a display apparatus, an optical filter for a display apparatus having the same, and a display apparatus having the same. The color compensation multi-layered member for a display apparatus includes a thin layer having a thickness of about 780 nm or less and a first refractive index; a first thick layer having a greater thickness than the thin layer, being formed on a surface of the thin layer, and having a second refractive index; and a second thick layer having a greater thickness than the thin layer, being formed on another surface of the thin layer, and having a third refractive index.

35 Claims, 28 Drawing Sheets

COLOR COMPENSATION MULTI-LAYERED MEMBER FOR DISPLAY APPARATUS, OPTICAL FILTER FOR DISPLAY APPARATUS HAVING THE SAME AND DISPLAY APPARATUS HAVING THE SAME

CROSS-REFERENCE TO RELATED APPLICATION

This application claims the benefit of Korean Patent Applications Nos. 10-2007-0129072, filed on Aug. 8, 2007, and 10-2007-0079554, filed on Dec. 12, 2007 in the Korean Intellectual Property Office, the entire disclosures of which are incorporated herein by reference.

BACKGROUND OF THE INVENTION

1. Field of the Invention

The present invention relates to a color compensation multi-layered member for a display apparatus, an optical filter for a display apparatus having the same, and a display apparatus having the same, and more particularly, to a color compensation multi-layered member for a display apparatus that may reduce a difference in a color change depending on an increase in a viewing angle to thereby improve the viewing angle performances, an optical filter for a display apparatus having the same, and a display apparatus having the same.

2. Description of Related Art

As modern society becomes more information oriented, technology of parts and devices related to information displays is remarkably advancing, and these parts and devices are becoming widespread. Display apparatuses utilizing parts and devices related to photoelectronics are becoming significantly widespread and used for television apparatuses, monitor apparatuses of personal computers, and the like. Also, display apparatuses are becoming both larger and thinner.

In general, Liquid Crystal Display (LCD) apparatuses are one of flat panel display apparatuses displaying images using liquid crystal. The LCD apparatuses are relatively thinner and lighter, and have relatively lower driving voltage and consumption power in comparison with other display apparatuses to thereby being widely used.

FIG. 1 is a schematic diagram illustrating a basic structure and driving principle of a Liquid Crystal Display (LCD). As illustrated in FIG. 1, two polarizing films 110 and 120 are attached on a conventional vertical alignment (VA) mode LCD in such a manner as to be perpendicular to each optical axis. Liquid crystal molecules 150 having birefringence characteristics are inserted and arranged between two transparent substrates 130 coated with a transparent electrode 140, and thereby the liquid crystal molecules 150 are moved perpendicularly to an electric field and arranged when the electric field is applied by a driving power unit 180. In this instance, a light from a backlight unit becomes a linearly polarized light after passing through a first polarizing film 120. As illustrated in a left side of FIG. 1, the liquid crystal is aligned perpendicularly to the substrate when OFF, so that the linearly polarized light may be maintained as is, thereby failing to pass through a second polarizing film 110 perpendicular to the first polarizing film 120. As illustrated in a right side of FIG. 1, the liquid crystal is horizontally aligned between the optical axes of the two polarizing films 110 and 120 perpendicular to each other in a direction parallel to the substrate due to the electric field when ON, so that a polarization state of the linearly polarized light obtained through the first polarizing film is changed into a circular polarization state or an elliptically polarization state immediately before the linearly polarized light reaches the second polarizing film while passing through the liquid crystal molecules, thereby passing through the second polarizing film. When the applied electric field is adjusted, alignment states of the liquid crystal may be gradually changed from vertical alignment to horizontal alignment, and thereby the light intensity is adjusted.

FIG. 2 is a schematic diagram illustrating an alignment state and optical transmission of liquid crystal displays depending on viewing angles.

Alignment states of the liquid crystal molecules may be differently visible depending on viewing angles when liquid crystal molecules within a pixel 220 are aligned in a certain direction. The alignment state of the liquid crystal molecules is visible to be nearly horizontal alignment 212 as viewed from a right direction 210 with respect to the normal direction 230 of the LCD screen, and thus the screen is visible to be relatively brighter. The alignment state of the same is visible to be nearly identical to that of the liquid crystal molecules within the pixel 220 as viewed from a normal direction 230 of the screen. The alignment of the same is visible to be vertical alignment 252 as viewed from a left direction 250 with respect to the normal direction of the screen, and thus the screen is visible to be relatively darker.

Thus, the LCD may exhibit changes in light intensity and color depending on the change in the viewing angle, and have large limitations in the viewing angle performances comparing with self-light emitting display apparatuses. Accordingly, many studies have been made to improve the viewing angle performances.

FIG. 3 is a schematic diagram illustrating an example of a conventional invention for improving change in a contrast ratio and color depending on change in a viewing angle.

Referring to FIG. 3, alignment states of two subpixels, that is, a first subpixel 320 and a second subpixel 340 are symmetrical with each other. The alignment states of the first and second subpixels 320 and 340 are simultaneously visible according to a direction viewed by a viewer, and the light intensity visible to the viewer is the sum of the light intensities of the respective subpixels. Specifically, each liquid crystal of the first and second subpixels 320 and 340 is visible to be horizontal alignment 312 and vertical alignment 314, respectively, as viewed from a right direction 310 with respect to the normal direction 330 of the LCD screen. Similarly, each liquid crystal of the first and second subpixels 320 and 340 is visible to be vertical alignment 352 and horizontal alignment 354, respectively, as viewed from a left direction 350 with respect to the normal direction 330 of the screen. Thus, the brightness of the screen in the respective directions 310 and 350 to the viewer may be identical and symmetrical with each other with respect to a vertical direction of the screen. So, the brightness of the screen in all directions, 310 330, and 350 to the viewer may be similar with each other. As a result, a degree of the change in the contrast ratio and color may be improved depending on the viewing angle.

FIG. 4 is a schematic diagram illustrating another example of a conventional invention for improving change in a contrast ratio and color depending on change in a viewing angle.

Referring to FIG. 4, an optical compensation film 420 is further included. The optical compensation film 420 has birefringent characteristics identical to that of liquid crystal molecules within an LCD panel 440. The alignment state of the liquid crystal molecules within the LCD panel 440 and an alignment state of virtual liquid crystal molecules of the optical compensation film 420 may be simultaneously visible to a viewer. The alignment state of the liquid crystal molecules within the LCD panel 440 and an alignment state of virtual liquid crystal molecules of the optical compensation film 420 are symmetrical with each other. The light intensity visible to the viewer may be the light intensities transmitted from the optical compensation film 420 and liquid crystal molecules in the LCD panel 440. Specifically, as viewed from the right direction 410, liquid crystal molecules within the LCD panel 440 are visible to be horizontal alignment 414, virtual liquid crystal molecules of the optical compensation film 420 are visible to be vertical alignment 412, and the light intensity visible to the viewer may be that transmitted from the virtual liquid crystal molecules in the vertical alignment 412 and liquid crystal molecules in the horizontal alignment 414. Similarly, as viewed from the left direction 450, the liquid crystal molecules within the LCD panel 440 are visible to be vertical alignment 454, the virtual liquid crystal molecules of the optical compensation film 420 are visible to be horizontal alignment 452, and the light intensity visible to the viewer may be that transmitted from the virtual liquid crystal molecules in the horizontal alignment 452 and the liquid crystal molecules in the vertical alignment 454. As viewed from the normal direction 430 of the LCD screen, the alignment state 434 of the liquid crystal molecules within the LCD panel 440 and the alignment state 432 of the virtual liquid crystal molecules within the optical compensation film 420 are visible to be symmetrical with each other. Thus, the brightness of the screen in the respective directions 410 and 450 to the viewer may be identical and symmetrical with each other with respect to a vertical direction of the screen. So, the brightness of the screen in all directions, 410 430, and 450 to the viewer may be similar with each other. As a result, changes in the contrast ratio and color depending on the change in the viewing angle may be improved, however, there still remain problems of brightness and the color change.

FIG. 5 is a graph illustrating results obtained by measuring changes in an emission spectrum depending on increases in viewing angles of an LCD according to a conventional invention. As illustrated in FIG. 5, the strength of the spectrum is gradually reduced along with an increase in the viewing angle. FIG. 6 is the normalized spectra, divided by the maximum value of each spectrum, depending on increases in viewing angles in order to accurately check the reduction degree of the strength of the spectrum for each wavelength range. As illustrated in FIG. 6, it can be seen that the strength of the spectrum normalized in a blue light region of about 400 to 500 nm is reduced along with the increase in the viewing angle, even though the strength of the spectrum normalized in another wavelength ranges is the same. This result shows that the strength of the spectrum normalized in the blue light region of about 400 to 500 nm is much more reduced along with the increase in the viewing angle in comparison with the other wavelength ranges. Thus, the change in the color along with the increase in the viewing angle such as being changed from white color to yellowish white color, that is, complementary color of blue color may incur deterioration of video quality. Also, a contrast ratio in a bright room may be reduced due to reflection of an external light, thereby incurring deterioration in visibility of the display.

SUMMARY OF THE INVENTION

An aspect of the present invention provides a color compensation multi-layered member for a display apparatus which may adjust a degree of reduction in spectrum strength for each wavelength range according to an increase in a viewing angle to thereby reduce color change, and thus improving image quality of the display apparatus.

An aspect of the present invention provides a color compensation multi-layered member for a display apparatus which may reduce reflection of an external light, thereby increasing a contrast ratio in a bright room and reducing color change occurring according to a vertical viewing angle.

An aspect of the present invention provides an optical filter for a display apparatus including the color compensation multi-layered member.

According to an aspect of the present invention, there is provided a color compensation multi-layered member for a display apparatus, the color compensation multi-layered member including: a thin layer having a thickness of about 780 nm or less and a first refractive index; a first thick layer having a greater thickness than the thin layer, being formed on a surface of the thin layer, and having a second refractive index; and a second thick layer having a greater thickness than the thin layer, being formed on another surface of the thin layer, and having a third refractive index.

In this instance, the first refractive index may be less than the second and third refractive indexes (N1<N2, N1<N3). The first refractive index may be from 1 to 2, and the second and third refractive indexes are from 2 to 4 ($1 \leq N1 \leq 2, 2 \leq N2, N3 \leq 4$).

Also, the first refractive index may be greater than the second and third refractive indexes (N1>N2, N1>N3). The first refractive index may be from 2 to 4, and the second and third refractive indexes are from 1 to 2 ($2 \leq N1 \leq 4, 1 \leq N2, N3 \leq 2$).

Also, the second and third refractive indexes may be the same or similar with each other, and the difference between the second and third refractive indexes may be required to be 1 or less. In this instance, the case where the difference therebetween is 1 may include a case where the second and third refractive indexes is the same ($0 \leq |N2-N3| \leq 1$).

In this instance, the color compensation multi-layered member may further include a substrate formed on either the first thick layer or the second thick layer and including a transparent resin; and an external light shielding film including external light shielding parts formed on a surface of the substrate, the external light shielding parts including an engraving pattern having a wedge-shaped cross section and being filled with a light absorbing substance.

According to an aspect of the present invention, there is provided a color compensation multi-layered member for a display apparatus, the color compensation multi-layered member including: a thin layer having a thickness of about 780 nm or less and a first refractive index; a substrate including a transparent resin, being formed on a surface of the thin layer, and having a second refractive index; and a first thick layer including external light shielding parts formed on a surface of the substrate and having a greater thickness than the thin layer, the external light shielding parts including an engraving pattern having a wedge-shaped cross section and being filled with a light absorbing substance. In this instance, the first thick layer may act as the external light shielding film, so that the external light is shielded and total reflection efficiency of the panel incident light is improved, thereby increasing a contrast ratio in a bright room of the display.

In this instance, a Pressure Sensitive Adhesive (PSA) may be further formed between the thin layer and the first thick layer. Also, the color compensation multi-layered member for the display apparatus may further include a second thick layer having a greater thickness than the thin layer, being formed on another surface of the thin layer, and having a third refractive index.

According to an aspect of the present invention, there is provided a color compensation multi-layered member for a display apparatus, the color compensation multi-layered member including: a birefringent thin layer having a thickness of about 780 nm or less, and having a first refractive index (Nx=Nz=N1) in x-axis and z-axis directions and a second refractive index (Ny=N2) in a y-axis direction; a first thick layer having a greater thickness than the birefringent thin layer, being formed on a surface of the birefringent thin layer, and having a third refractive index (N3); and a second thick layer having a greater thickness than the birefringent thin layer, being formed on another surface of the birefringent thin layer, and having a fourth refractive index (N4). The x-axis, y-axis, and z-axis will be described in detail with reference to FIG. 21. AS illustrated in FIG. 21, the x-axis may denote a stacked direction of each layer with respect to a horizontal direction. The y-axis may denote a direction parallel to a surface of each layer with respect to a vertical direction. The z-axis may denote a direction parallel to a surface of each layer with respect to a direction perpendicular to the ground of drawing.

In this instance, a difference between the second refractive index and the third refractive index may be 1 (0≦|N2−N3|≦1, 0≦|N2−N4|≦1), or less (N2(=Ny)<N3, N2(=Ny)<N4), and a difference between the second refractive index and the fourth refractive index may be 1 or less. The first refractive index may be less than the third and fourth refractive indexes (N1(=Nx,Nz)<N3, N1(=Nx,Nz)<N4). In this instance, the case where the difference therebetween is 1 may include a case where the refractive indexes are the same.

Also, the first refractive index may be from 1 to 2, and the third and fourth refractive indexes may be from 2 to 4, respectively (1≦N1≦2, 2≦N3,N4≦4).

Also, the second refractive index may be greater than the third and fourth refractive indexes (N2(=Ny)>N3, N2(=Ny)>N4), and the difference therebetween may be less than 1(0≦|N2−N3|≦1, 0≦|N2−N4|≦1). The first refractive index may be greater than the third and fourth refractive indexes (N1(=Nx, Nz)>N3, N1(=Nx,Nz)>N4). In this instance, the case where the difference therebetween is 1 may include a case where the refractive indexes are the same.

In this instance, the first refractive index may be from 2 to 4, and the third and fourth refractive indexes may be from 1 to 2, respectively (2≦N1≦4, 1≦N3,N4≦2).

In this instance, the third refractive index (N3) of the first thick layer and the fourth refractive index (N4) of the second thick layer may be the same or similar with each other, and the difference between is required to be 1 or less. In this instance, the case where the difference therebetween is 1 may include a case where the refractive indexes are the same (0≦|N3−N4|≦1).

Also, the color compensation multi-layered member for the display apparatus may further a substrate formed on either the first thick layer or the second thick layer, and including a transparent resin; and an external light shielding film including external light shielding parts formed on a surface of the substrate, the external light shielding parts including an engraving pattern having a wedge-shaped cross section and being filled with a light absorbing substance.

According to an aspect of the present invention, there is provided a color compensation multi-layered member for a display apparatus, the color compensation multi-layered member including: a birefringent thin layer having a thickness of about 780 nm or less, and having a first refractive index in x-axis and z-axis directions and a second refractive index in a y-axis direction; a substrate including a transparent resin, being formed on a surface of the birefringent thin layer, and having a third refractive index; and a first thick layer including external light shielding parts formed on a surface of the substrate and having a greater thickness than the birefringent thin layer, the external light shielding parts including an engraving pattern having a wedge-shaped cross section and being filled with a light absorbing substance.

In this instance, a PSA may be further formed between the birefringent thin layer and the first thick layer.

In this instance, the color compensation multi-layered member may further include a second thick layer having a greater thickness than the thin layer, being formed between the thin layer and the transparent substrate, and having a third refractive index.

In this instance, the thickness of the first and second thick layers may be 780 nm or more, and preferably from 780 nm to 5 mm.

In this instance, a thickness (l) and refractive index (n) of the thin layer, and a reflectivity (R) on an interface of the first thick layer and thin layer are adjusted, so that a mean value of a transmittance (T) according to the following Equation 1 and Equation 2 is maximized with respect to a blue light region having a wavelength (λ) of about 380 to 500 nm.

$$T=(1-R)^2/(1+R^2-2R\cos\delta) \quad \text{[Equation 1]}$$

$$\delta=(2\pi/\lambda)2nl\cos\theta(0°\leq\theta\leq80°) \quad \text{[Equation 2]}$$

In this instance, the refractive indexes of the first and second thick layers may be the same, however, the similar results may be acquired even in a case of different refractive indexes thereof. Also, in the case where the thin layer is the birefringent thin layer, n may denote a refractive index of the external light entering (see in FIGS. 21 to 24) on a x-y plane determined by the x-axis and y-axis, and n may be determined by a combination of the refractive index (Nx) in the x-axis and the refractive index (Ny) in the y-direction. For example, when the external light enters in a direction (x-direction of FIG. 21) perpendicular to the birefringent thin layer, n may be Nx.

In this instance, when the transmittance with respect to a blue light region having a wavelength of about 380 to 500 nm may increase as the incident angle of the light increase from 0° to 80°.

In this instance, when the transmittance with respect to green or red light region having a wavelength of about 500 to 780 nm may increase as the incident angle of the light increase from 0° to 80°.

In this instance, a ratio of a minimum transmittance to a maximum transmittance within a wavelength of about 380 to 780 nm may be about 0.5 to 0.9.

In this instance, at least one of the first and second thick layers may be selected from a glass, a PSA, a transparent resin film, or an anti-reflection film.

According to an aspect of the present invention, there is provided an optical filter for a display apparatus, the optical filter including any one of the above-described color compensation multi-layered members. An anti-reflection film may be formed on a surface of the color compensation multi-layered member, however, the present invention is not limited thereto, and thus the anti-reflection film may be formed on both surfaces of the color compensation multi-layered member. The color compensation multi-layered member may include a thin layer having a thickness of 780 nm or less and a first refractive index (N1), and a first thick layer having a greater thickness than the thin layer and a second refractive index (N2), and being formed on a surface of the thin layer.

In the instance, the optical filter for the display apparatus may further include a second thick layer having a greater thickness than the thin layer and a third refractive index (N3), and being formed on another surface of the thin layer. In this instance, repeated descriptions of mutual relations between the first, second, and third refractive indexes (N1), (N2), and (N3) will be herein omitted. Also, at least one of the first and second thick layers may be a transparent substrate, and the remaining thick layer may be the PSA for adhering between the thin layer and the anti-reflection film. The transparent substrate may include a tempered glass or a soft plastic substrate. Also, a reflectivity of the anti-reflection film may be preferably 2% or less.

The optical filter for the display apparatus according to another aspect of the present invention may include an anti-reflection film formed on a surface of both surfaces of the color compensation multi-layered member. In this instance, the color compensation multi-layered member may include a birefringent thin layer having a thickness of about 780 nm or less, and having a first refractive index (Nx=Nz=N1) in x-axis and z-axis directions and a second refractive index (Ny=N2) in a y-axis direction; and a first thick layer having a greater thickness than the birefringent thin layer and a third refractive index (N3), and being formed on a surface of the birefringent thin layer.

In this instance, the optical filter for the display apparatus may further include a second thick layer having a greater thickness than the thin layer and a fourth refractive index (N4), and being formed on another surface of the birefringent thin layer. Also, at least one of the first and second thick layers may be a transparent substrate, and the remaining thick layer may be the PSA for adhering between the thin layer and the anti-reflection film. The transparent substrate may include a tempered glass or a soft plastic substrate. Also, a reflectivity of the anti-reflection film may be preferably 2% or less. In this instance, repeated descriptions of mutual relations between the first, second, third, and fourth refractive indexes (N1), (N2), (N3), and (N4) will be herein omitted. Also, repeated descriptions of the x-axis, y-axis, and z-axis will be herein omitted.

According to an aspect of the present invention, there is provided an optical filter for a display apparatus, the optical filter including: a transparent substrate; an external light shielding film including external light shielding parts formed on a surface of the transparent substrate, the external light shielding parts being filled with a light absorbing substance; an anti-reflection film formed on the external light shielding film and adapted to prevent reflection of an external light; a birefringent thin layer having a thickness of about 780 nm or less, being formed on another surface of the transparent substrate, and having a first refractive index (Nx=Nz=N1) in x-axis and z-axis directions and a second refractive index (Ny=N2) in a y-axis direction; and a first thick layer having a greater thickness than the birefringent thin layer, being formed on the birefringent thin layer, and having a third refractive index (N3) less than the first refractive index. In this instance, the transparent substrate may act as the second thick layer. In this instance, the transparent substrate may be exclusive of the configuration of the optical filter for the display apparatus, and in this case, the external light shielding film may act as the second thick layer. Also, a PSA for adhering the external light shielding film and the thin layer may be used instead of using the transparent substrate, and in this case, the PSA may act as the second thick layer.

According to an aspect of the present invention, there is provided an optical filter for a display apparatus, the optical filter including: a transparent substrate; an external light shielding film including external light shielding parts formed on a surface of the transparent substrate, the external light shielding parts being filled with a light absorbing substance; an anti-reflection film formed on another surface of the transparent substrate and adapted to prevent reflection of an external light; and a color compensation multi-layered member for a display apparatus formed on a surface of the external light shielding film.

In this instance, the color compensation multi-layered member for the display apparatus may include a birefringent thin layer having a thickness of about 780 nm or less, and having a first refractive index (Nx=Nz=N1) in x-axis and z-axis directions and a second refractive index (Ny=N2) in a y-axis direction; a first thick layer having a greater thickness than the birefringent thin layer, being formed on a surface of the birefringent thin layer, and having a third refractive index (N3); and a second thick layer having a greater thickness than the birefringent thin layer, being formed on another surface of the birefringent thin layer, and having a fourth refractive index (N4). In this instance, the transparent substrate may include a tempered glass, and a reflectivity of the anti-reflection film may be 2% or less.

According to an aspect of the present invention, there is provided an optical filter for a display apparatus, the optical filter including: a transparent substrate; a transparent substrate; an anti-reflection film formed on a surface of the transparent substrate; a thin layer having a thickness of about 780 nm or less, being formed on another surface of the transparent substrate, and having a first refractive index; and a first thick layer having a greater thickness than the thin layer, being formed on the thin layer, and having a second refractive index. In this instance, the transparent substrate may include a tempered glass, and the reflectivity of the anti-reflection film may be 2% or less.

In this instance, the optical filter for the display apparatus may further include a second thick layer having a greater thickness than the thin layer, being formed between the thin layer and the transparent substrate, and having a third refractive index.

According to an aspect of the present invention, there is provided an optical filter for a display apparatus, the optical filter including: a transparent substrate; an external light shielding film including external light shielding parts formed on a surface of the transparent substrate, the external light shielding parts being filled with a light absorbing substance; an anti-reflection film formed on the external light shielding film and adapted to prevent reflection of an external light; a birefringent thin layer having a thickness of about 780 nm or less, being formed on another surface of the transparent substrate, and having a first refractive index in x-axis and z-axis directions and a second refractive index in a y-axis direction; and a first thick layer having a greater thickness than the birefringent thin layer, being formed on the birefringent thin layer, and having a third refractive index less than the first refractive index. In this instance, the transparent substrate may include a tempered glass, and a reflectivity of the anti-reflection film may be 2% or less.

In this instance, the optical filter for the display apparatus may further include a second thick layer having a greater thickness than the birefringent thin layer, being formed between the birefringent thin layer and the transparent substrate, and having a greater thickness than the birefringent thin layer, and having a fourth refractive index.

According to an aspect of the present invention, there is provided a display apparatus, the display apparatus including any one of a panel assembly for a display apparatus and the above-described optical filter for the display apparatus. The panel assembly for the display apparatus may include upper and lower substrates made of a glass, and a liquid crystal layer formed between the upper substrate and the lower substrate.

According to an aspect of the present invention, there is provided a display apparatus, comprising: an upper substrate and a lower substrate each being made of a glass; and a panel assembly for the display apparatus, the panel assembly including a liquid crystal layer formed between the upper and lower substrates. In this instance, a first thick layer may be disposed on the liquid crystal layer, a thin layer may be disposed on the first thick layer, and the upper substrate may be disposed on the thin layer. In this case, the upper substrate may act as the thick layer.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
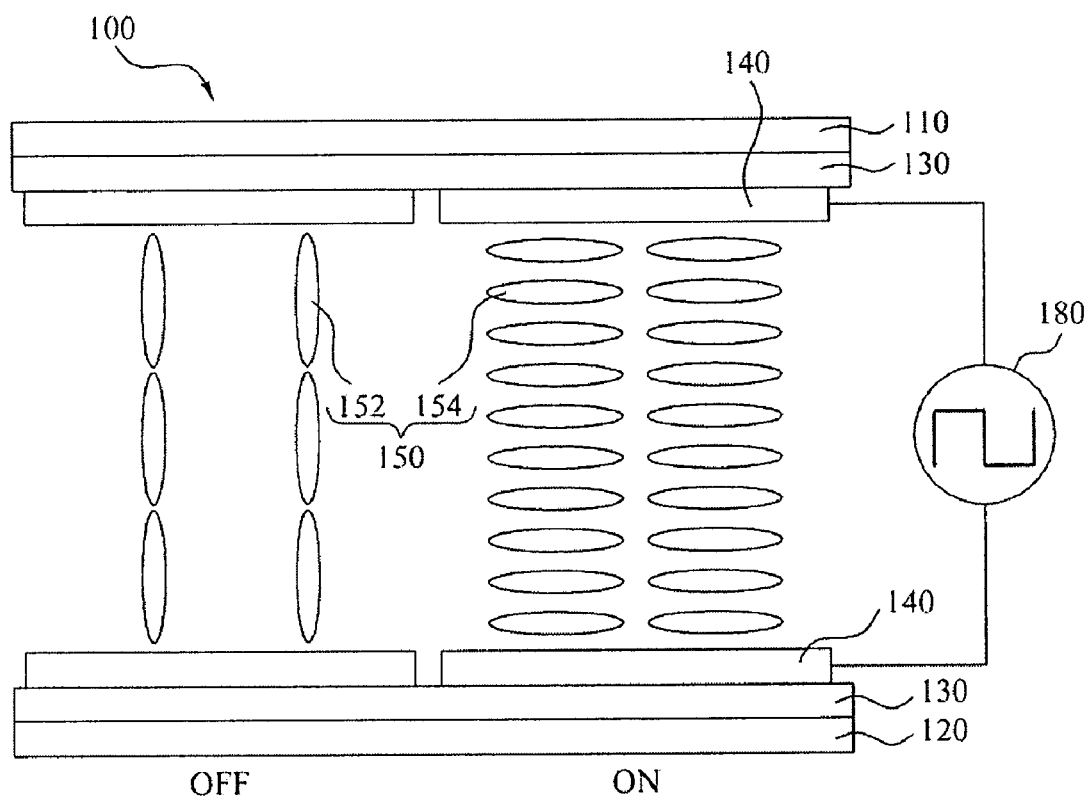
FIG. 1 is a schematic diagram illustrating a basic structure and driving principle of a Liquid Crystal Display (LCD)
Figure 2:
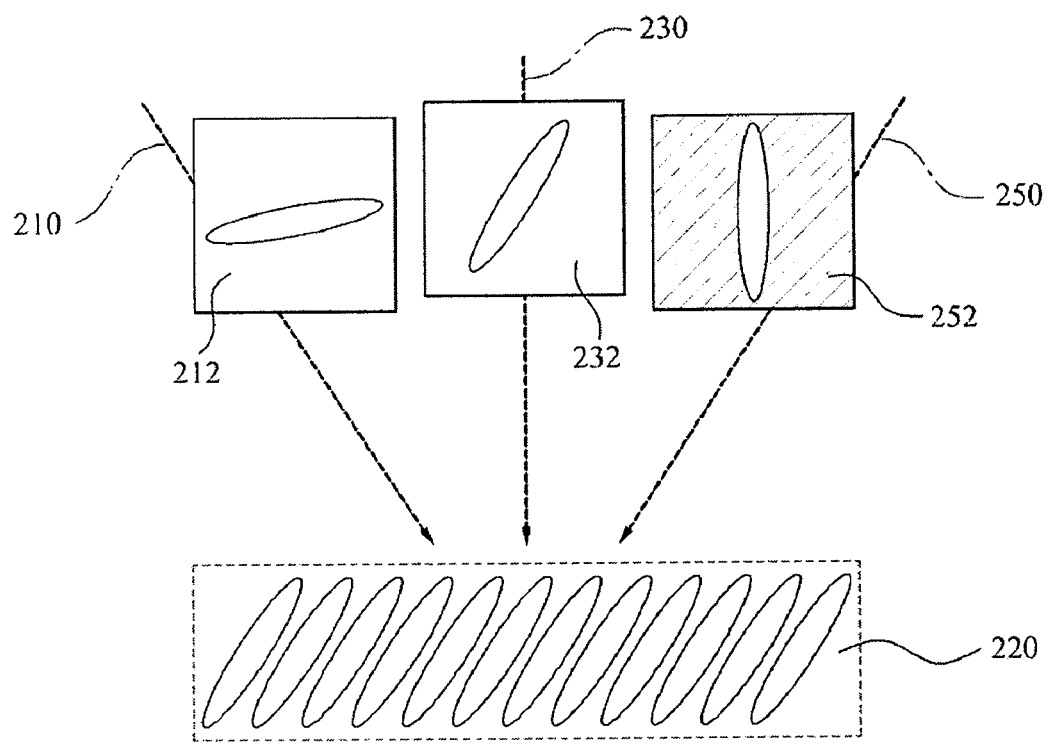
FIG. 2 is a schematic diagram illustrating an alignment state and optical transmission of liquid crystal depending on a viewing angle.
Figure 3:
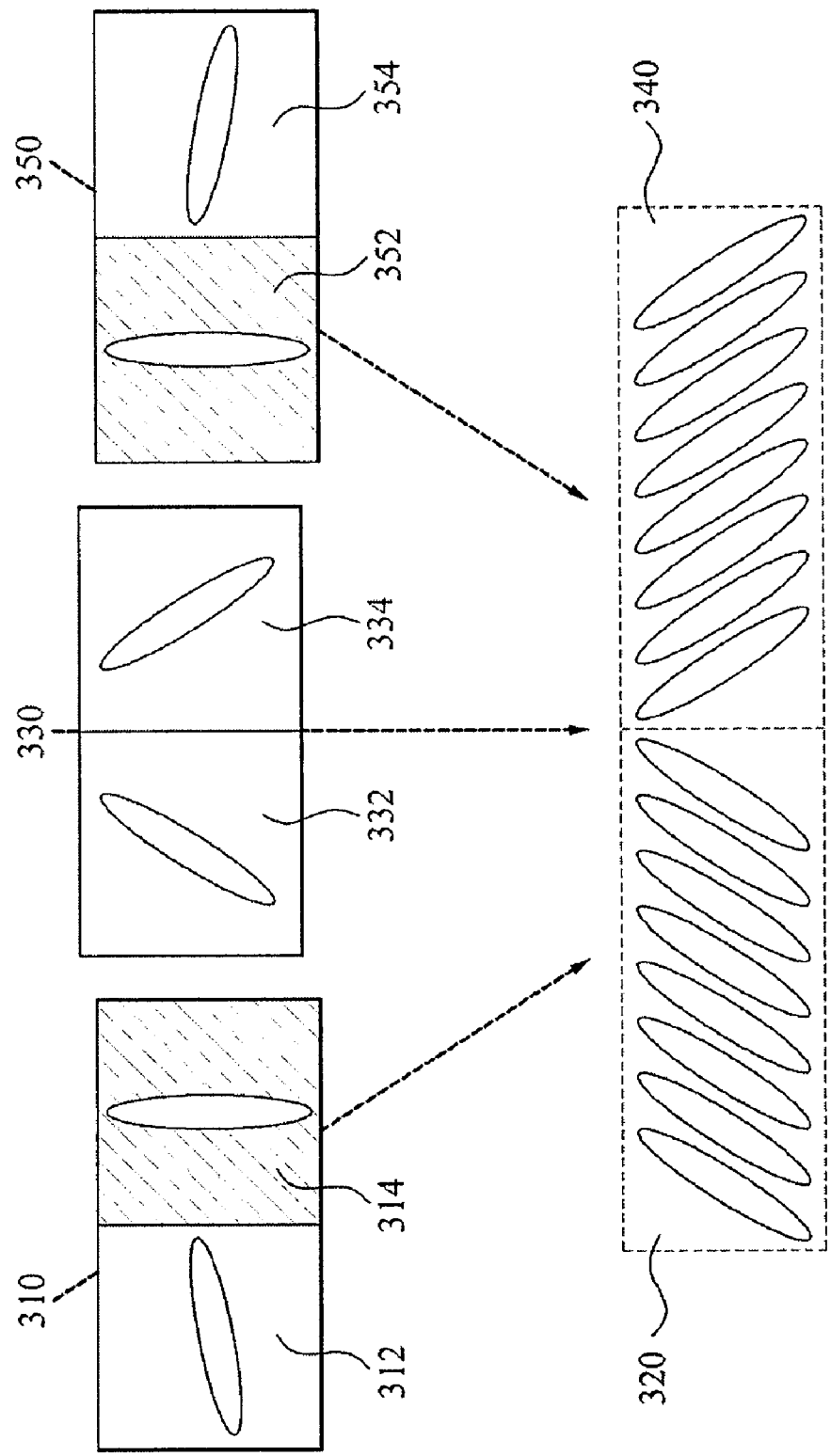
FIG. 3 is a schematic diagram illustrating an example of a conventional invention for improving change in a contrast ratio and color depending on change in a viewing angle.
Figure 4:
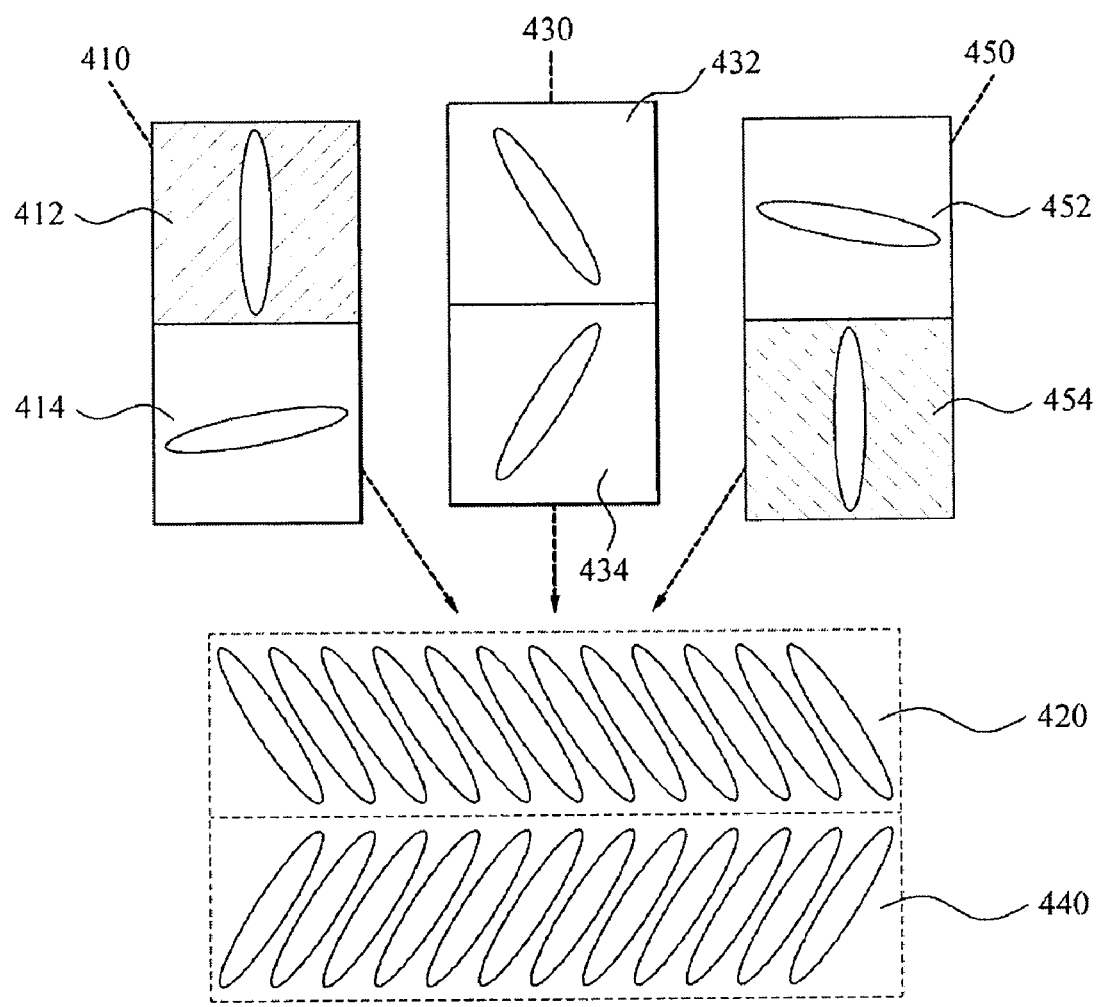
FIG. 4 is a schematic diagram illustrating another example of a conventional invention for improving change in a contrast ratio and color depending on change in a viewing angle.
Figure 5:
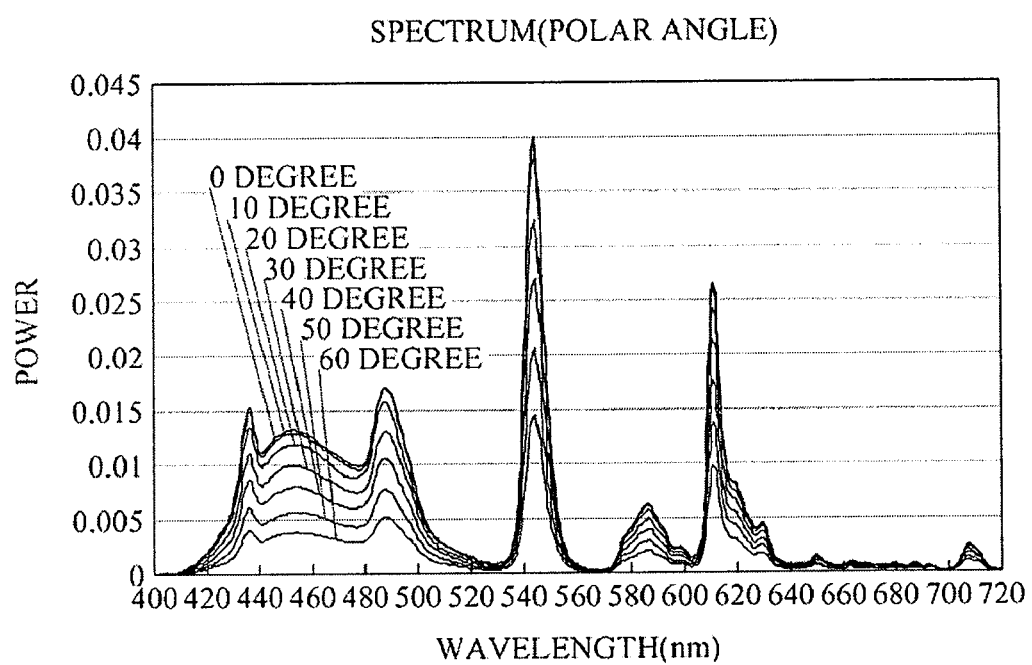
FIG. 5 is a graph illustrating results obtained by measuring change in an emission spectrum depending on an increase in a viewing angle of an LCD according to a conventional invention.
Figure 6:
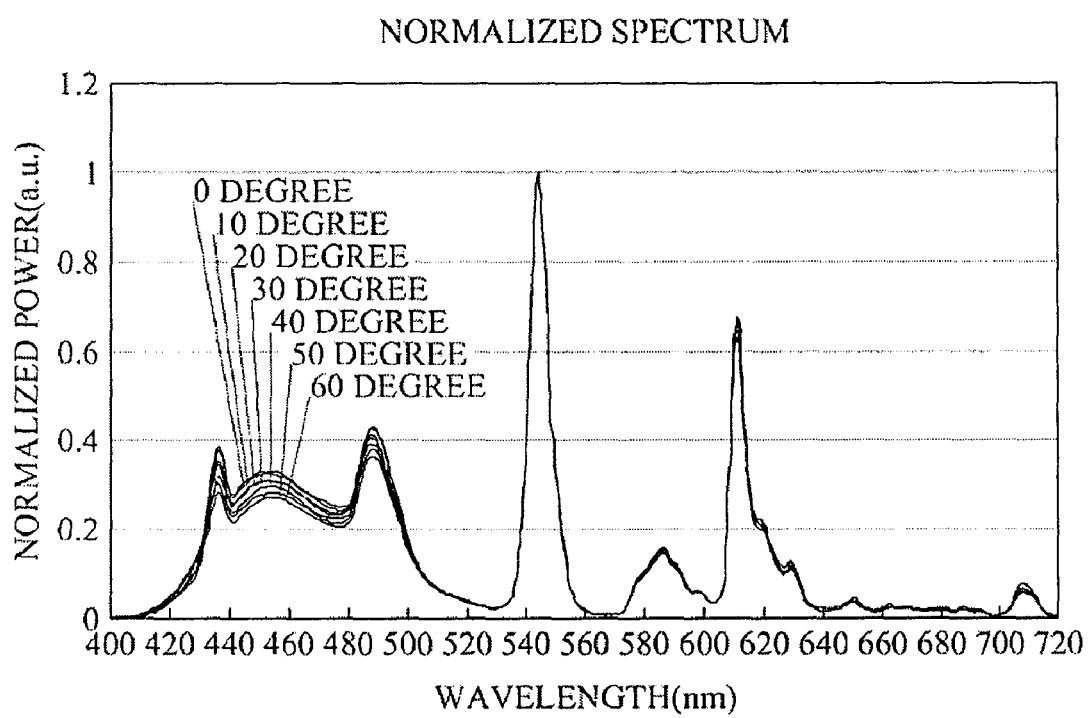
FIG. 6 is a graph obtained by normalizing the results of FIG. 5.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 7:
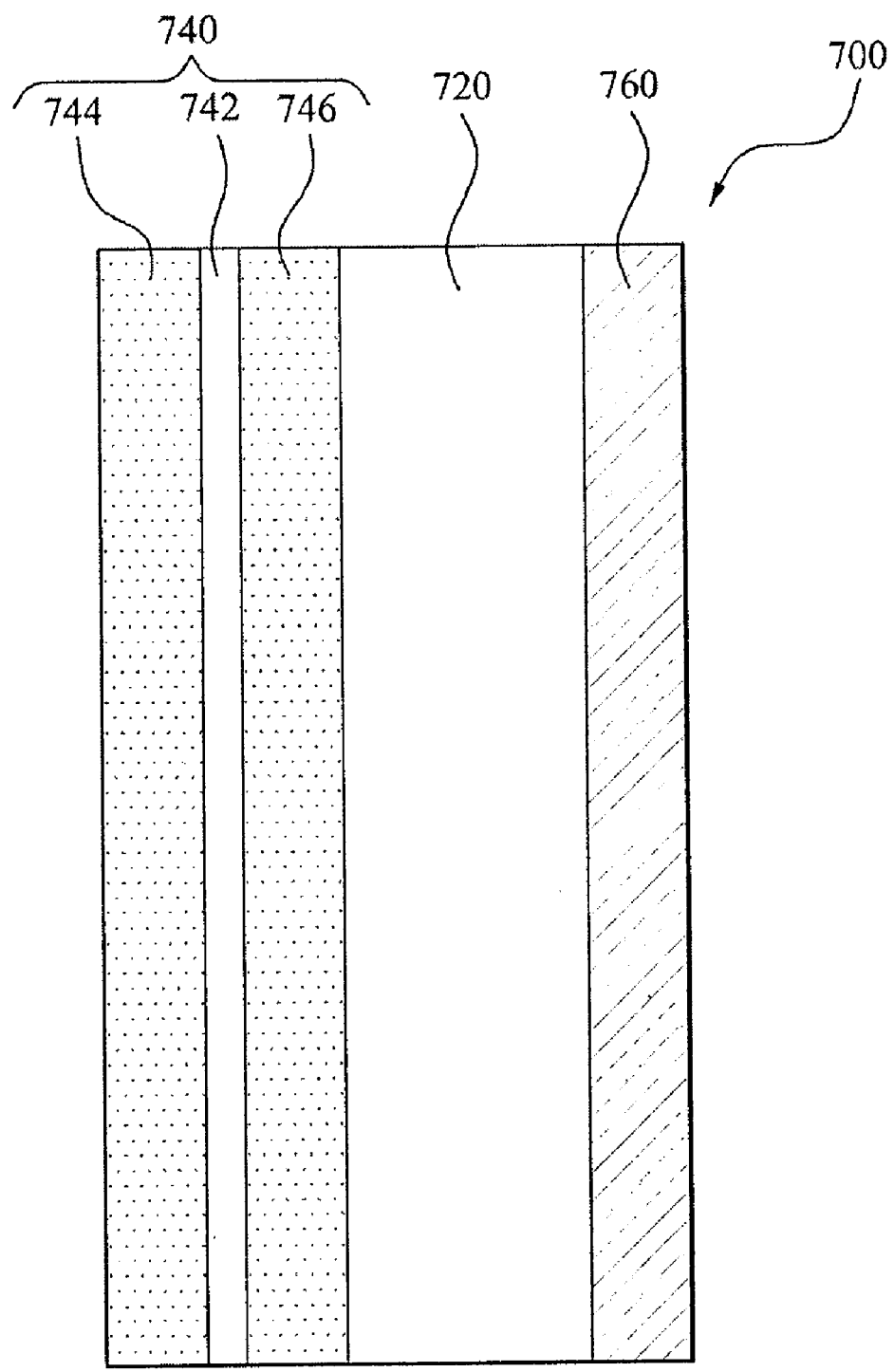
FIG. 7 is a cross-sectional diagram illustrating an optical filter for a display apparatus according to an exemplary embodiment of the present invention.

FIG. 7 is a cross-sectional diagram illustrating an optical filter 700 for a display apparatus according to an exemplary embodiment of the present invention.

Referring to FIG. 7, the optical filter 700 includes a transparent substrate 720, a color compensation multi-layered member 740, and an anti-reflection film 760. The optical filter 700 may further include functional films such as a film for improving a contrast ratio in a bright room, an electromagnetic wave-shielding film, a neon-cut film, a light-diffusion film, and the like according to types of the display apparatus.

The anti-reflection film 760 is formed on a surface of the transparent substrate 720, and the color compensation multi-layered member 740 is formed on another surface of the transparent substrate 720. The present invention is not limited by the above-mentioned stacked order, however, the anti-reflection film 760 is preferably formed on the surface of a viewer side when the optical filter 700 is mounted on the display apparatus. The anti-reflection film 760 functions to prevent an external light entering from the viewer side from being reflected to the outside, thereby increasing a contrast ratio of the display. The anti-reflection film 760 may preferably have a reflectivity of 2% or less. Since a reflectivity of a glass surface is 4%, there is not a big difference between cases of using the anti-reflection film 760 having a reflectivity of 2% or more and not using the anti-reflection film 760.

As examples of a material of the transparent substrate 720, inorganic compound molds such as glass, quartz, and the like, and transparent organic polymer molds may be given. As examples of the transparent substrate 720 made of the organic polymer molds, acrylic, and polycarbonates may be given, however, the present invention is not limited thereto. The transparent substrate 720 may preferably have a high transparency and thermal resistance, and may use polymeric molds or a polymeric mold-layered body. As for the transparency of the transparent substrate 720, a transmittance of a visible ray is preferably 80% or more. As for the thermal resistance thereof, a glass transition temperature is preferably 50° C. or more. A tempered glass may be preferably used for the transparent substrate 720 in view of external impact prevention and the transparency.

The color compensation multi-layered member 740 includes a first thick layer 744, a thin layer 742, and a second thick layer 746. The thin layer 724 is disposed between the first and second thick layers 744 and 746, and a thickness of the thin layer 724 is less than or identical to a wavelength range of a visible ray. Accordingly, the thickness of the thin layer 724 may be 780 nm or less. In the case of the thin layer 724 having a thickness greater than 780 nm, constructive interference and destructive interference may not occur in the visible-ray range.

Also, the first and second thick layers 744 and 746 are thicker than the thin layer 724. A thickness of the thick layers 744 and 746 is greater than 780 nm, and may reach several mm. The thickness of the thick layers 744 and 746 is identical to each other to thereby have a symmetrical structure, however, the present invention is not limited thereto.

The thin layer 742, the first thick layer 744, and the second thick layer 746 have a first refractive index, a second refractive index, and a third refractive index, respectively. The first refractive index may be greater than or less than the second and third refractive indexes.

The color compensation multi-layered member 740 according to the present exemplary embodiment of the invention may be manufactured such that the thin layer having a relatively less refractive index is formed between the thick layers having a relatively great refractive index. The refractive index of the first and second thick layers 744 and 746 is from 2 to 4, and the refractive index of the thin layer 742 is from 1 to 2, however, the present invention is not limited thereto and thus, the refractive index may be diversely changed in order to adjust the transmittance and reflectivity.

Hereinafter, reflection and transmission processes of a light in the color compensation multi-layered member will be described in detail with reference to FIG. 8.

Figure 8:
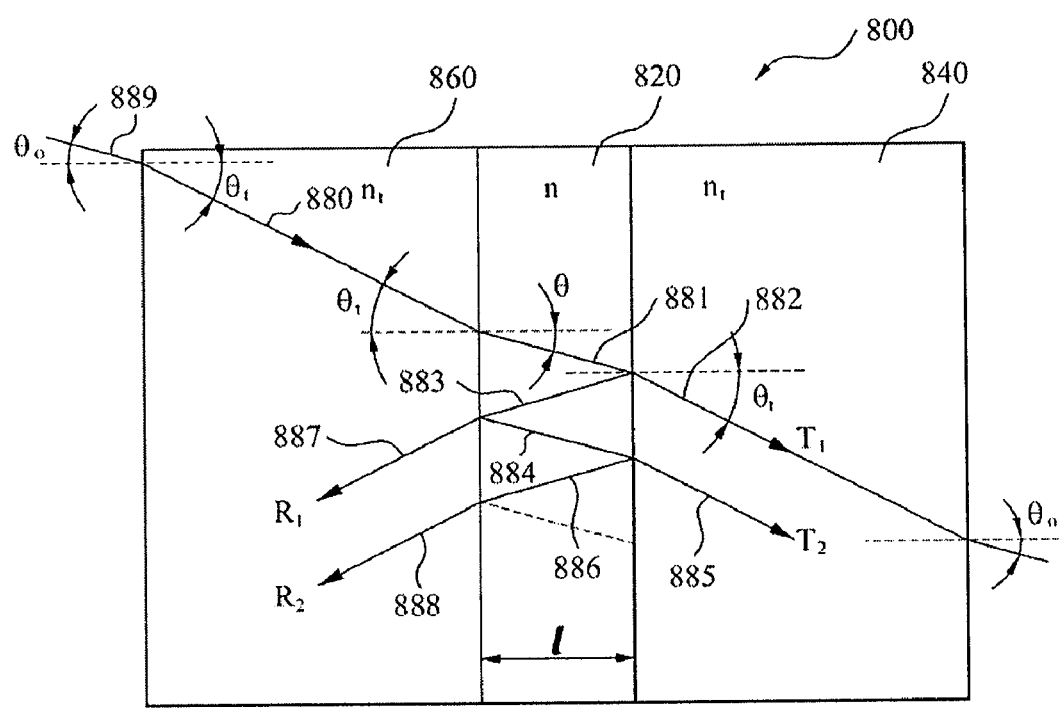
FIG. 8 is a schematic diagram illustrating reflection and transmission of a light in a color compensation multi-layered member for a display apparatus according to an exemplary embodiment of the present invention.

FIG. 8 is a schematic diagram illustrating reflection and transmission of a light in a color compensation multi-layered member 800 for a display apparatus according to an exemplary embodiment of the present invention.

The color compensation multi-layered member 800 includes a thin layer 820 formed therein intermediately, and first and second thick layers 860 and 840 formed on both surfaces of the thin layer 820. A refractive index of the thin layer 820 may designate 'n', and refractive indexes of the first and second thick layers 860 and 840 may designate '$n_t$'.

According to the present exemplary embodiment of the invention, the refractive indexes of the first and second thick layers 860 and 840 are the same, however, the present invention is not limited thereto.

The first thick layer 860 is disposed in a panel assembly side, and the second thick layer 840 is disposed in a viewer side. An incident light 880 of the thin layer entering from the panel assembly toward the thin layer is partially transmitted in a refractive manner and partially reflected due to a difference of the refractive indexes on an interface of the thin layer 820 and the first thick layer 860. An angle formed between a normal line with respect to the interface and the incident light 880 may designate '$\theta_t$', and a transmitted light 881 transmitted across the thin layer in a refractive manner may designate '$\theta$'. The transmitted light 881 is partially refracted on the interface of the thin layer 820 and the second thick layer 840 to thereby become a transmitted light 882 of the thin layer transmitting across the second thick layer 840, and also the transmitted light 881 is partially reflected to thereby become an inner reflected light 883 of the thin layer. In this instance, an angle formed between the transmitted light 882 of the thin layer and a normal line with respect to an interface of the thin layer 820 and the second thick layer 840 may be determined by a difference of the refractive indexes of the thin layer 820 and the second thick layer 840. According to the present exemplary embodiment of the invention, the refractive indexes of the first and second thick layers 860 and 840 are the same, and thereby the angle formed between the transmitted light 822 and the normal line with respect to the interface of the thin layer 820 and the second thick layer 840 is '$\theta_t$'. The angle $\theta_t$ may be represented by the below Equation 5 based on the Snell's law using an angle $\theta_o$ formed when an incident light 889 from a panel assembly enters the color compensation multi-layered member, a refractive index $n_t$ of the thick layer, and a refractive index $n_O(=1)$ of the air. A transmitted angle of a light, which is finally emitted such that the incident light 889 from the panel assembly transmits across a filter for a display apparatus including the color compensation multi-layered member, may be identical to the incident angle $\theta_O$ based on the Snell's law, and thereby each $\theta_O$ may correspond to a viewing angle viewed by an observer.

A reflectivity on each of the interfaces may be represented by $$R_p=[(n_t \cos\theta - n\cos\theta_t)/(n_t\cos\theta + n\cos\theta_t)]^2, \quad \text{[Equation 3]}$$

and $$R_s=[(n\cos\theta - n_t\cos\theta_t)/(n\cos\theta + n_t\cos\theta_t)]^2, \quad \text{[Equation 4]}$$

wherein $R_p$ denotes a reflectivity when p-polarized light is reflected, and $R_s$ denotes a reflectivity when s-polarized light is reflected.

$$n_t \sin\theta_t = n_O \sin\theta_O \quad \text{[Equation 5]}$$

It can be seen that $R_p$ and $R_s$ of the reflectivity may vary by a refractive index (n, $n_t$) of the thin layer and the thick layer, an incident angle ($\theta_t$), and a refracting angle ($\theta$).

R of the reflectivity of the above Equation 1 is a mean of $R_p$ of Equation 3 and $R_s$ of Equation 4.

The inner reflected light 883 of the thin layer is again partially transmitted in a refractive manner on the interface to thereby become a reflected light 887 of the thin layer, and again partially reflected to thereby become an inner reflected light 884 of the thin layer. These processes are repeatedly performed.

The transmittance T of Equation 1 is the sum of a transmittance $T_1$ by the transmitted light 882 of the thin layer and a transmittance $T_2$ by a transmitted light 885 of the thin layer 885. Two refracted lights are illustrated in FIG. 8, however, reflection and refraction on the interface is repeatedly performed, the sum total of each transmittance by these refracted lights is the entire transmittance T.

The reflectivity R on the interface is the sum of a reflectivity $R_1$ by the reflected light 887 of the thin layer and a reflectivity $R_2$ by a reflected light 888 of the thin layer. Similarly, only two reflected lights are illustrated in FIG. 8, however, the sum total of each reflectivity by all reflected lights reflected on the interface is the entire reflectivity R.

The transmittance may vary according to a wavelength by interferences generated in a process of multiple reflection of the light occurring by two interfaces formed by the first thick layer 860, the thin layer 820, and the second thick layer 840. A phase difference of the transmitted lights 882 and 885 of the thin layer may designate δ, which is represented by the above Equation 2. In this instance, δ may be determined by a thickness (l) and refractive index (n) of the thin layer 820, a refracting angle (θ), and a wavelength (λ). A maximum transmittance may be obtained when an optical path length difference between the transmitted lights 882 and 885 of the thins layer is an integer of the wavelength.

Figure 9:
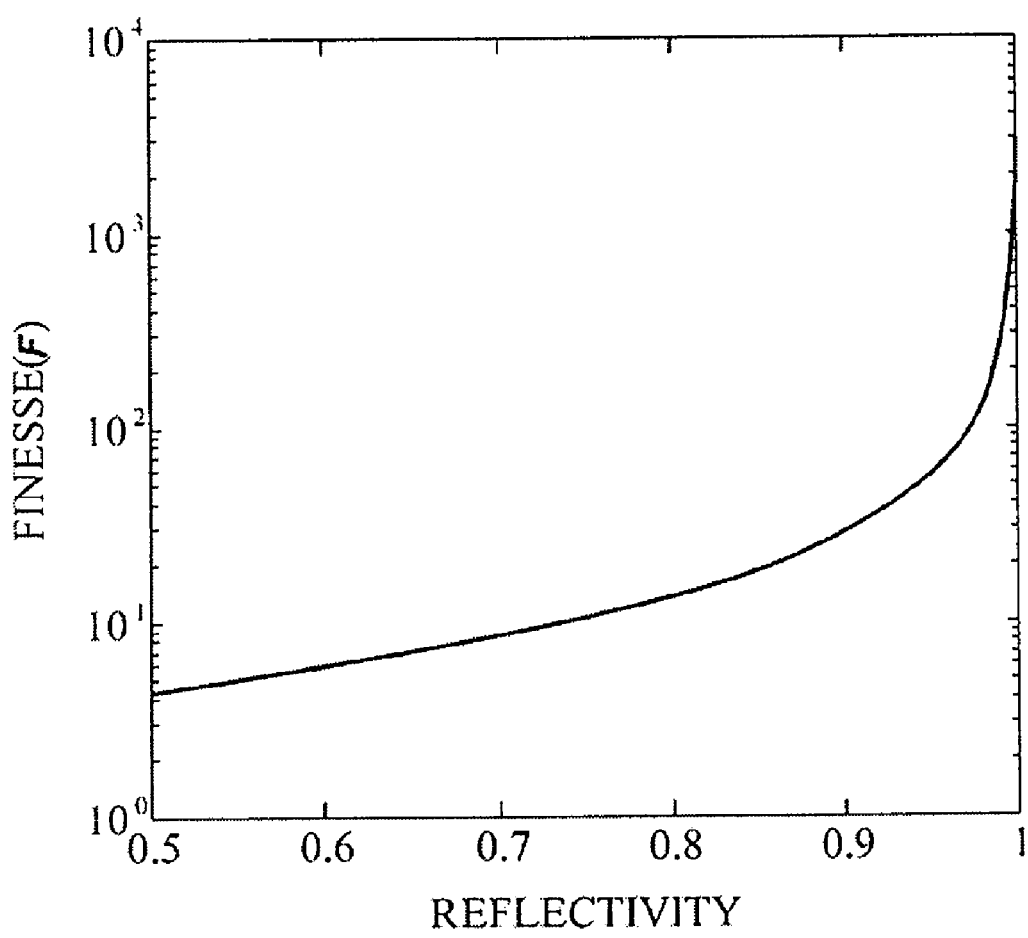
FIG. 9 is a graph illustrating change in a transmittance depending on a wavelength and finesse of a light in the optical filter for the display apparatus of FIG. 7.

FIG. 9 is a graph illustrating change in a transmittance depending on a wavelength and finesse of a light in the optical filter for the display apparatus of FIG. 7.

Constructive interference or destructive interference may occur according to a phase difference. When the thickness (l) and refractive index (n) of the thin layer 820 are determined, the transmittance may vary depending on the wavelength as illustrated in FIG. 9.

The finesse F is represented by $$F=\pi/(2\arcsin(1/f^{1/2})).$$ [Equation 6]

In this instance, f designates a coefficient of finesse, which is represented by $$f=4R/(1-R)^2,$$ [Equation 7]

wherein R denotes a reflectivity.

Figure 10:
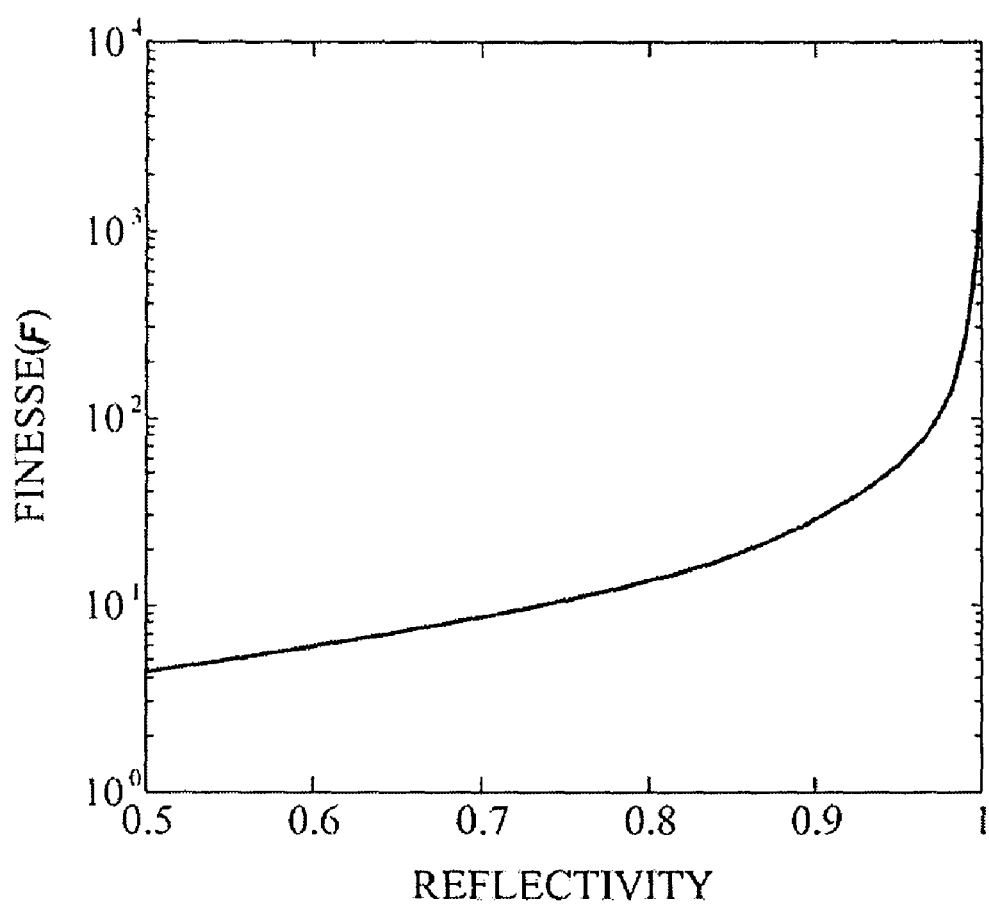
FIG. 10 is a graph illustrating a relation between the finesse and reflectance in the optical filter for the display apparatus of FIG. 7.

As illustrated in FIG. 9, as the finesse increases (F=10), a transmitted peak becomes narrower and sharper and a minimum transmittance may be reduced. A relation between the finesse and the reflectivity is illustrated in FIG. 10. Accordingly, a width (Δλ) of the transmitted peak and the minimum transmittance may be adjusted by adjusting the reflectivity R. As illustrated in FIG. 9, so that a ratio of a minimum transmittance to a maximum transmittance in the entire visible ray-wavelength range is in a range of 0.7 to 0.9, the reflectivity is required to be reduced. As can be seen in Equations 3 and 4, the reflectivity may vary according to the refractive index (n, $n_t$) of the thin layer and the thick layer, and the viewing angle $\theta_O$. Thus, the reflectivity may be determined when the refractive index (n, $n_t$) of the thin layer and the thick layer are adjusted with respect to a specific viewing angle ($\theta_O$). Also, the phase difference (δ) may be determined when the thickness (l) and refractive index (n) of the thin layer are determined with respect to a specific wavelength range. In this case, the refracting angle (θ) may be automatically determined when the refractive index (n, $n_t$) of the thin layer and the thick layer and the viewing angle ($\theta_O$) are determined. Accordingly, as shown in Equation 1, the transmittance T is determined when the reflectivity R and the phase difference δ are determined. Specifically, a transmittance may be adjusted with respect to a specific viewing angle and a specific wavelength light by selecting the refractive index (n, $n_t$) of the thin layer and the thick layer and the thickness (l) of the thin layer. For example, when the thickness of the thin layer of 780 nm or less, the refractive index of the thin layer being from 1 to 2, and the refractive index of the thick layer being from 2 to 4 are selected, a transmittance with respect to a light of a specific wavelength range in a relatively larger viewing angle range may increase. Contrarily, even when the refractive index of the thin layer is greater than that of the thick layer, for example, the refractive index of the thin layer being from 2 to 4 and the refractive index of the thick layer being from 1 to 2, the same effect may be obtained.

As described above, a characteristics in which a light intensity in a blue light wavelength range (380 to 500 nm) is relatively much reduced along with an increase in the viewing angle may be compensated using multi-beam interferences. Specifically, when the viewing angle is relatively great of about 60 degrees, constructive interference may occur in the blue light wavelength range, thereby increasing the transmittance, and destructive interference may occur in a green or red wavelength range, thereby reducing the transmittance. Thus, a degree of reduction in the light intensity in all wavelength ranges is the same or similar with each other even when the viewing angle is relatively great, thereby compensating the imbalance in the blue light wavelength range. As described above, the color compensation multi-layered member for the display apparatus according to the present invention may function to minimize viewing angle-dependent color change.

Figure 14:
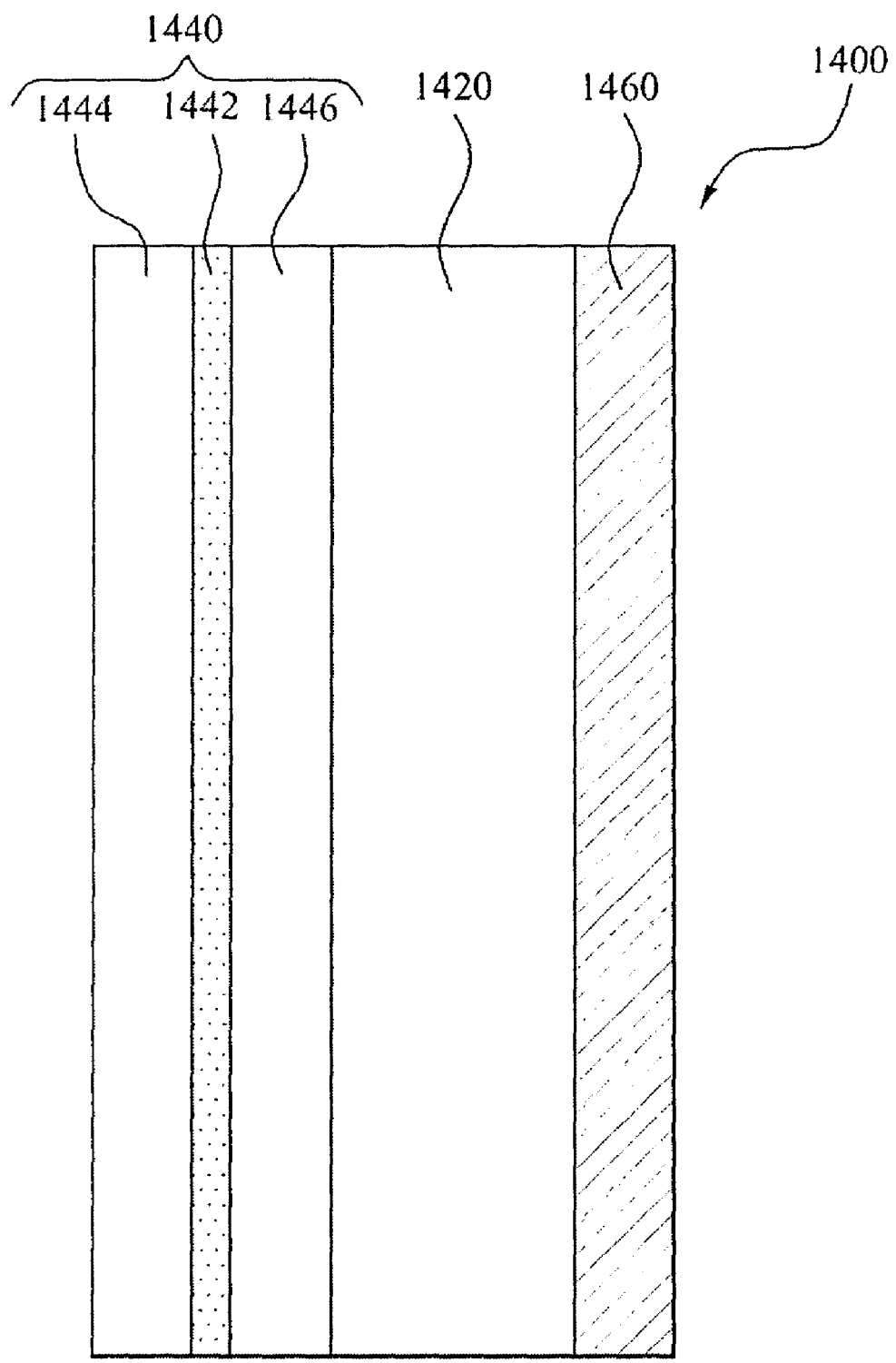
FIG. 14 is a cross-sectional diagram illustrating an optical filter for a display apparatus according to another exemplary embodiment of the present invention.

FIG. 14 is a cross-sectional diagram illustrating an optical filter 1400 for a display apparatus according to another exemplary embodiment of the present invention. The repeated descriptions of the color compensation multi-layered member for the display apparatus and optical filter for the same will be herein omitted.

Referring to FIG. 14, the optical filter 1400 for the display apparatus according to the present exemplary embodiment of the invention is constructed such that an anti-reflection film 1460 is formed on a surface of a transparent substrate 1420, and a color compensation multi-layered member 1440 is formed on another surface of the transparent substrate 1420. The color compensation multi-layered member 1440 is manufactured such that a thin layer 1442 is formed between a first thick layer 1444 and a second thick layer 1446. A refractive index of the first and second thick layers 1444 and 1446 is less than that of the thin layer 1442. Specifically, the thin layer having a relatively higher refractive index is formed between the thick layers having a relatively lower refractive index. The refractive index of the first and second thick layers 1444 and 1446 is from 1 to 2, and the refractive index of the thin layer 1442 is from 2 to 4. At least one of the thick layers 1444 and 1446 may include a glass. In the case of using a tempered glass having a refractive index of about 1.5 as the transparent substrate 1420, the second thick layer 1446 abutting against the transparent substrate 1420 may be omitted from a configuration of the optical filter 700.

Figure 15:
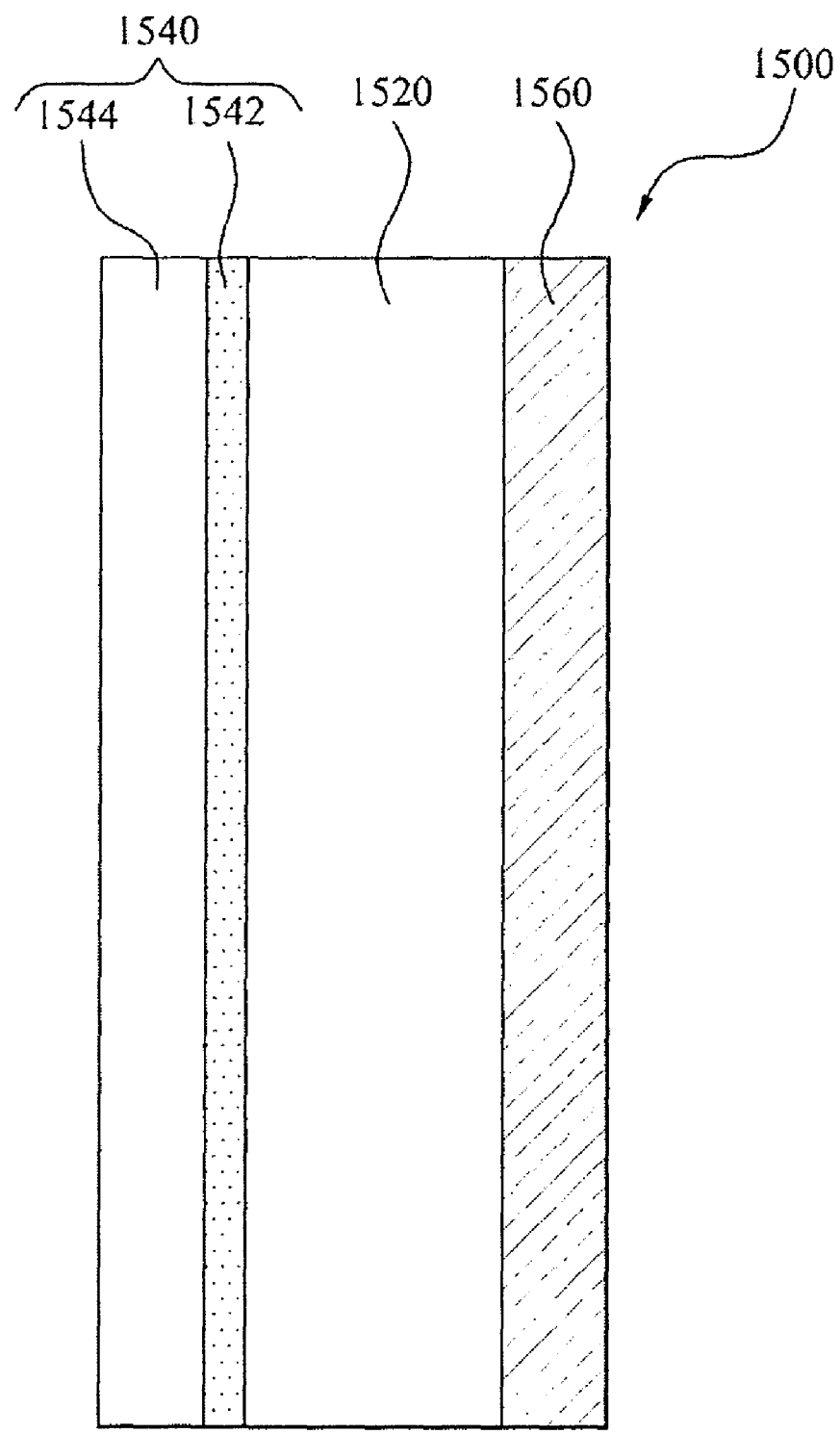
FIG. 15 is a cross-sectional diagram illustrating an optical filter for a display apparatus according to another exemplary embodiment of the present invention.

FIG. 15 is a cross-sectional diagram illustrating an optical filter for a display apparatus according to another exemplary embodiment of the present invention.

Referring to FIG. 15, the optical filter 1500 for the display apparatus is constructed such that an anti-reflection film 1560 is formed on a surface of a transparent substrate 1520, and a thin layer 1542 having a high refractive index and thick layer 1544 having a low refractive index are formed on another surface of the transparent substrate 1520. As described above, the transparent substrate 1520 may act as the thick layer. In this case, costs in the manufacture process may be significantly reduced.

Figure 21:
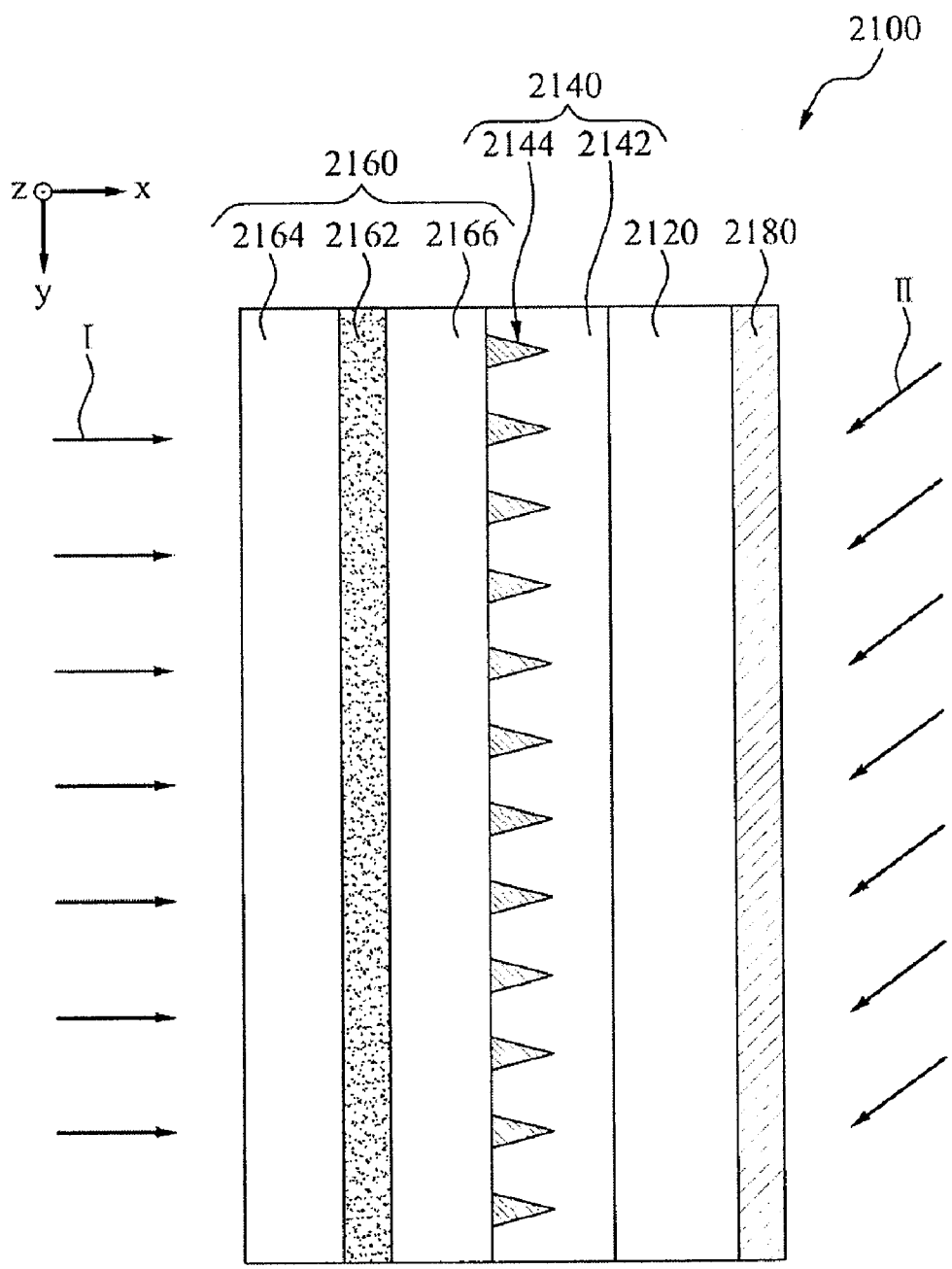
FIG. 21 is a cross-sectional diagram illustrating an optical filter for a display apparatus according to another exemplary embodiment of the present invention.

FIG. 21 is a cross-sectional diagram illustrating an optical filter 2100 for a display apparatus according to another exemplary embodiment of the present invention. Referring to FIG.

21, the optical filter 2100 includes a transparent substrate 2120, an external light shielding film 2140, a color compensation multi-layered member 2160, and an anti-reflection film 2180. The optical filter may further include functional films such as an electromagnetic wave-shielding film, a neon-cut film, a light-diffusion film, and the like according to types of the display apparatus.

The anti-reflection film 2180 is formed on a surface of the transparent substrate 2120, and the external light shielding film 2140 and the color compensation multi-layered member 2160 are formed on another surface of the transparent substrate 2120. The present invention is not limited by the above-mentioned stacked order, however, the anti-reflection film 2180 is preferably formed on the surface of a viewer side when the optical filter 2100 is mounted on the display apparatus. The anti-reflection film 2180 functions to prevent an external light (II) entering from the viewer side from being reflected to the outside, thereby increasing a contrast ratio of the display. The anti-reflection film 2180 may preferably have a reflectivity of 2% or less. In a case of using a glass substrate as the transparent substrate 2120, a reflectivity of a glass surface is 4%, and thus there is not a big difference between cases of using the anti-reflection film 2180 having a reflectivity of 2% or more and not using the anti-reflection film 2180.

As examples of a material of the transparent substrate 2120, inorganic compound molds such as glass, quartz, and the like, and transparent organic polymer molds may be given. As examples of the transparent substrate 2120 made of the organic polymer molds, acrylic, and polycarbonates may be given, however, the present invention is not limited thereto. The transparent substrate 2120 may preferably have a high transparency and thermal resistance, and may use polymeric molds or a polymeric mold-layered body. As for the transparency of the transparent substrate 2120, a transmittance of a visible ray is preferably 80% or more. As for the thermal resistance thereof, a glass transition temperature is preferably 50° C. or more. A tempered glass may be preferably used for the transparent substrate 2120 in view of external impact prevention and the transparency.

The external light shielding film 2140 includes a substrate 2142 made of a transparent resin, and external light shielding parts 2144 formed on a surface of the substrate 2142. According to the present exemplary embodiment of the invention, the external light shielding parts 2144 may have a wedge shaped-cross section, however, the present invention is not limited thereto. The external light shielding parts 2144 may have a rectangular shape, trapezoid shape, semi-circular shape, U-shape, and the like in their cross-section.

The external light shielding parts 2144 may include an engraving pattern formed on a surface of the substrate 2142 and being filled with a light absorbing substance therein. The light absorbing substance may use a black substance such as carbon black and the like.

The external light shielding film 2140 functions to absorb an external light to prevent the external light (II) from entering from the panel assembly, and transmit and total reflect, to a viewer side, a panel incident light (I) emitted from the panel assembly. As a result, a high transmittance and contrast ratio may be obtained with respect to a visible ray. Also, the external light shielding film 2140 according to the present invention may simultaneously have a light absorbing substance and a conductive substance such as a silver paste each filled therein, thereby supplementing an electromagnetic wave shielding function of the optical filter 2100.

A bottom surface of the external light shielding parts 2144 being parallel to a surface of the substrate 2142 is formed in a panel assembly direction from which the panel incident light (I) enters, however, the present invention is not limited thereto. Specifically, the bottom surface of the external light shielding parts 2144 may be formed in a viewer side from which the external light (II) enters, or on both surfaces of the substrate 2142.

A difference between refractive indexes of the external light shielding parts 2144 and the substrate 2142 is 0.5 or less. Thus, the difference therebetween is required to be in a range of 0.01 to 0.5 when the refractive index of the external light shielding parts 2144 is less than that of the substrate 2142. Images entering from the panel assembly are total reflected when the difference between the refractive indexes is within the above-mentioned range, thereby increasing emission efficiency emitting to a display screen and also increasing absorption efficiency of the external light (II). Particularly, the refractive index of the external light shielding parts 2144 may have a value from 0.01 to 0.5 less than that of the substrate 2142. That is, the external light shielding film 2140 may have a shielding function by absorption of the external light rather than reflection function of the external light.

The color compensation multi-layered member 2160 includes a birefringent thin layer 2162, a first thick layer 2164, and a second thick layer 2166. The birefringent thin layer 2162 is formed between the first and second thick layers 2164 and 2166, and a thickness of the birefringent thin layer 2162 is less than or identical to a wavelength range of a visible ray. Accordingly, the thickness of the birefringent thin layer 2162 is preferably about 780 nm or less. When the thickness of the birefringent thin layer 2162 is 780 nm or more, constructive inference and destructive inference in the visible ray range may not occur.

Figure 26:
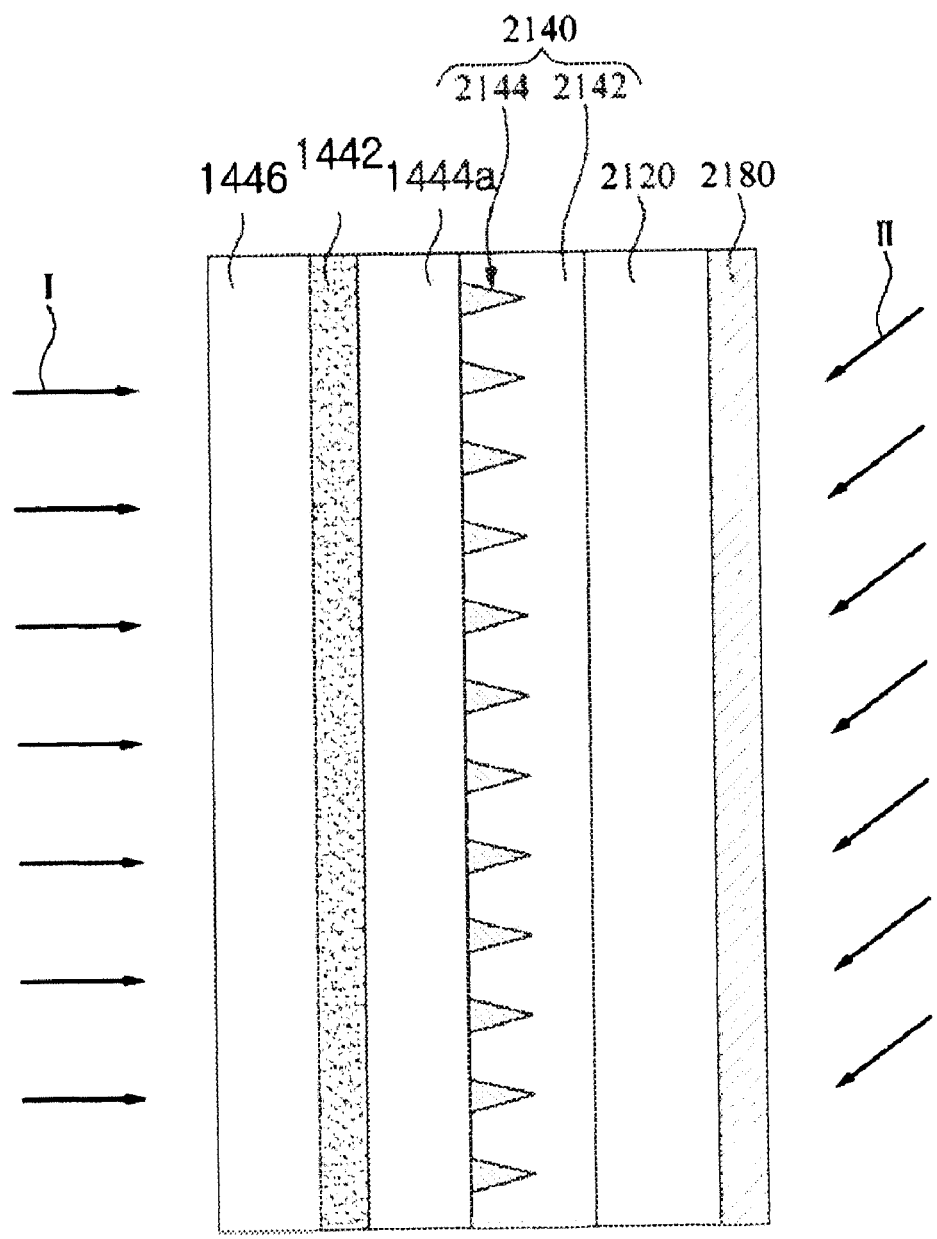
FIG. 26 is a cross-sectional diagram illustrating an optical filter for a display apparatus according to another exemplary embodiment of the present invention.
Figure 27:
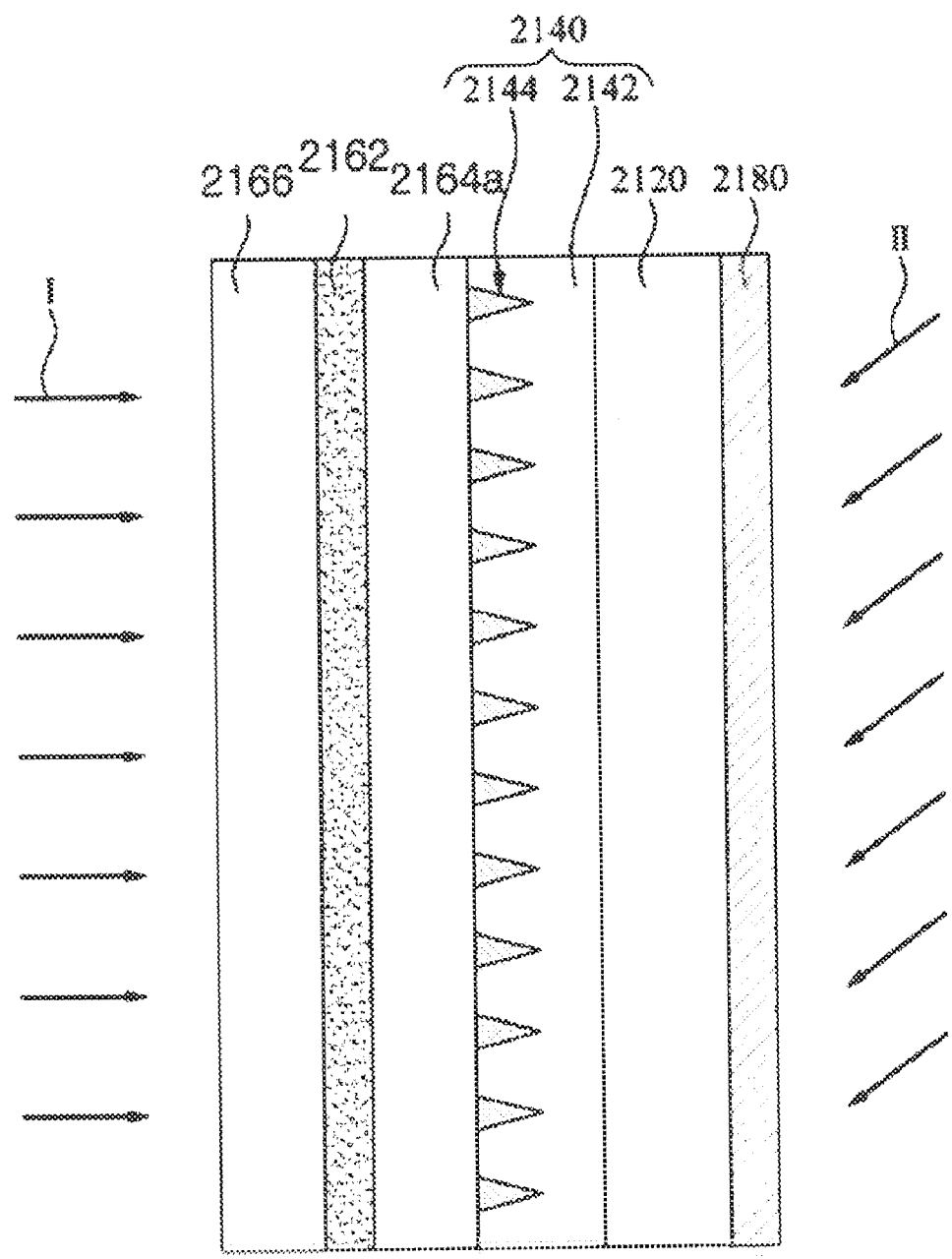
FIG. 27 is a cross-sectional diagram illustrating an optical filter for a display apparatus according to another exemplary embodiment of the present invention.
Figure 28:
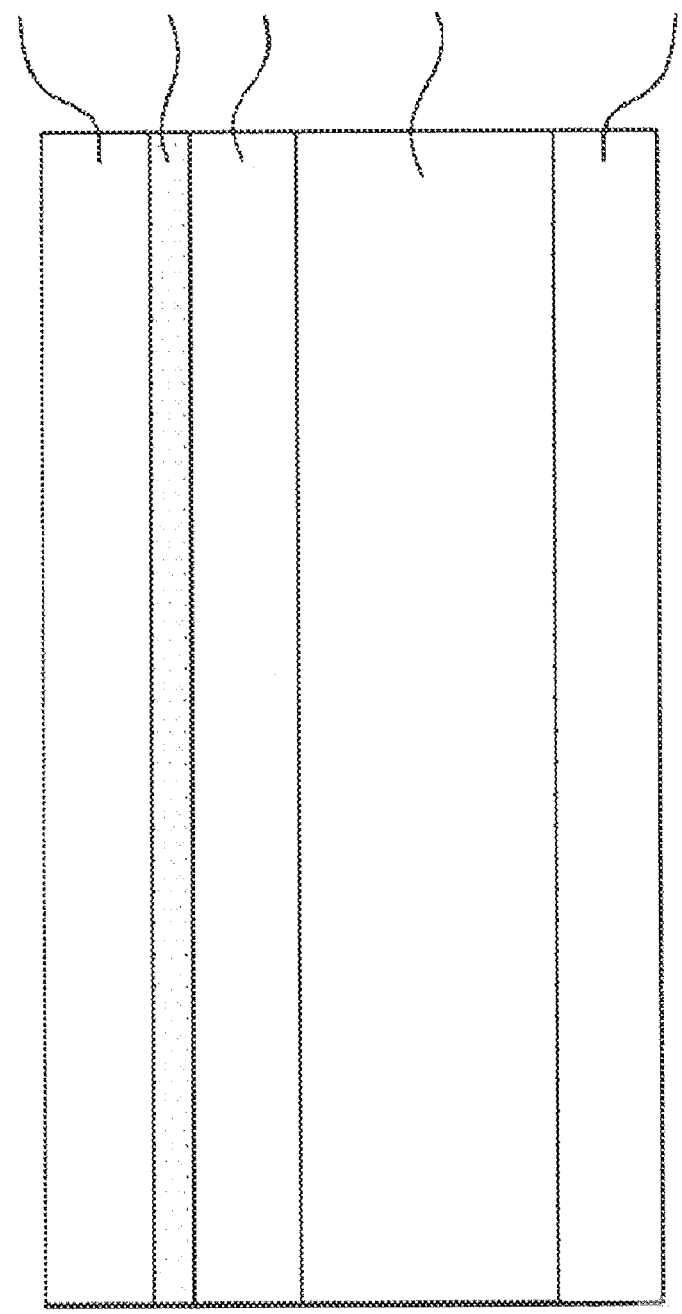
FIG. 28 is a cross-sectional diagram illustrating a multi-layer member for a display apparatus according to another exemplary embodiment of the present invention.

Also, the first and second thick layers 2164 and 2166 are thicker than the birefringent thin layer 2162, and the thickness of each of the thick layers 2164 and 2166 is 780 nm or may reach several mm. As illustrated in FIG. 1, the thickness of each of the thick layers 2164 and 2166 is the same, so that the color compensation multi-layered member 2160 may have a symmetric structure, however, the present invention is not limited thereto. Also, referring to FIGS. 26 and 27, a Pressure Sensitive adhesive (PSA) 1444a or 2164a may be included in the first thick layer 2164 or the second thick layer 2166. In general, the PAS may have a refractive index of about 1.5, and a thickness of the PAS may reach several micrometers. Accordingly, referring to FIG. 28, a PSA 1444 may be formed for the purpose of direct adhesion between the display panel and the filter without separately forming the thick layer, or for the purpose of mutual adhesion of films constituting the filter, and thus the PSA 1444 may act as the thick layer. In this case, the manufacture costs may be significantly reduced, and the thickness of the filter may be reduced, thereby increasing a transmittance of the panel incident light (I).

The birefringent thin layer 2162 may have a first refractive index (Nx=Nz=N1) of a horizontal direction (x-direction in FIG. 21) of a normal line direction with respect to a surface of the birefringent thin layer 2162 and in a direction (z-direction in FIG. 21) parallel to a surface of the thin layer, and a second refractive index (Ny=N2) of a vertical direction (y-direction in FIG. 21) parallel to the surface of the birefringent thin layer 2162. The first thick layer 2164 may have a third refractive index (N3), and the second thick layer 2166 may have a fourth refractive index (N4). Each difference between the second and third refractive indexes and between the second and fourth refractive indexes is 1 or less, and the first refractive index is less than the third and fourth refractive indexes. Specifically, the thin layer has a low refractive index, and the thick layer has a high refractive index, and thereby color compensation effects are obtained by selective constructive or destructive inferences depending on a wavelength of the light.

According to another exemplary embodiment of the invention, each difference between the second and third refractive indexes and between the second and fourth refractive indexes is 1 or less, and the first refractive index is greater than the third and fourth refractive indexes. Specifically, the thin layer has a high refractive index, and the thick layer has a low refractive index, and thereby color compensation effects are also obtained by selective constructive or destructive inferences depending on a wavelength of the light. However, even in any case, each difference between the second refractive index (Ny=N2) of the y-direction of the birefringent thin layer 2162 and the third and fourth refractive indexes of the thick layer should be 1 or less.

When the refractive indexes of the thick layer and thin layer are different from each other in order to minimize color change depending on the change in the viewing angle, a contrast ratio in a bright room may be reduced by the reflection of the external light occurring due to the difference of the refractive indexes. The anti-reflection film 2180 may only reduce the reflection occurring between the transparent substrate 2120 and an air layer, however, may not reduce the reflection on the interface of the thin and thick layers. Accordingly, in order to reduce reflection of the external light occurring due to the difference between refractive indexes of the thick and thin layers, a birefringent substance in which a refractive index vary according to a direction of the thin layer may be used. Since the external light (II) obliquely enters from the above the panel assembly and a viewer, the thin layer includes the birefringent substance so that a difference between a refractive index of a vertical direction (y-direction) with respect to a stacked direction of the thin layer and the refractive index of the thick layer is 1 or less. As described above, the use of the birefringent thin layer 2162 may be effective in reduction of the reflection of the external light. A reflectivity in a blue or red light wavelength may reach 20% when the thin layer does not include the birefringent substance. According to the present exemplary embodiment of the invention, the difference between the refractive index of the vertical direction (y-direction) with respect to the stacked direction of the thin layer and the refractive index of the thick layer is reduced, thereby reducing the reflectivity of the external light.

However, when the difference between the refractivity of the y-direction and the refractivity of the thick layer is reduced, a function for compensating the color change depending on the change in the vertical viewing angle may be deteriorated. This problem may be overcome by attaching the external light shielding film 2140 on a surface of the second thick layer 2166 of the viewer side. As described above, the external light shielding film 2140 may function to shield the external light to thereby significantly reduce the reflection of the external light, and lights emitted from the panel assembly in different directions are mixed by a total reflection effect occurring in a certain angle or more due to difference in refractive indexes between the substrate 2142 and external light shielding parts 2144, thereby greatly reducing the color change depending on the change of the viewing angle.

A magnitude of the second refractive index of the birefringent thin layer 2162 may be greater by 1 or less than those of the third and fourth refractive indexes, and contrarily, may be less by 1 or less than the same. The present invention may include a case where the magnitude of the second refractive index of the birefringent thin layer 2162 is identical to those of the third refractive index of the first thick layer 2164 and the fourth refractive index of the second thick layer 2166.

Meanwhile, the first reflective index (Nx=Nz=N1), that is, the refractive index of x-axis direction and z-axis direction of the birefringent thin layer 2162 may be greater or less than the third refractive index (N3) and the fourth refractive index (N4), that is, the refractive indexes of the thick layers. The magnitude of the first refractive index (N1) may be greater or less by at least 1 than the third and fourth refractive indexes.

The first refractive index may be from 2 to 4, and the third and fourth refractive indexes may be from 1 to 2. Contrarily, the first refractive index may be from 1 to 2, and the third and fourth refractive indexes may be from 2 to 4. However, the present invention is not limited thereto, and thus the refractive index may be diversely changed in order to adjust the transmittance and reflectivity.

Figure 22:
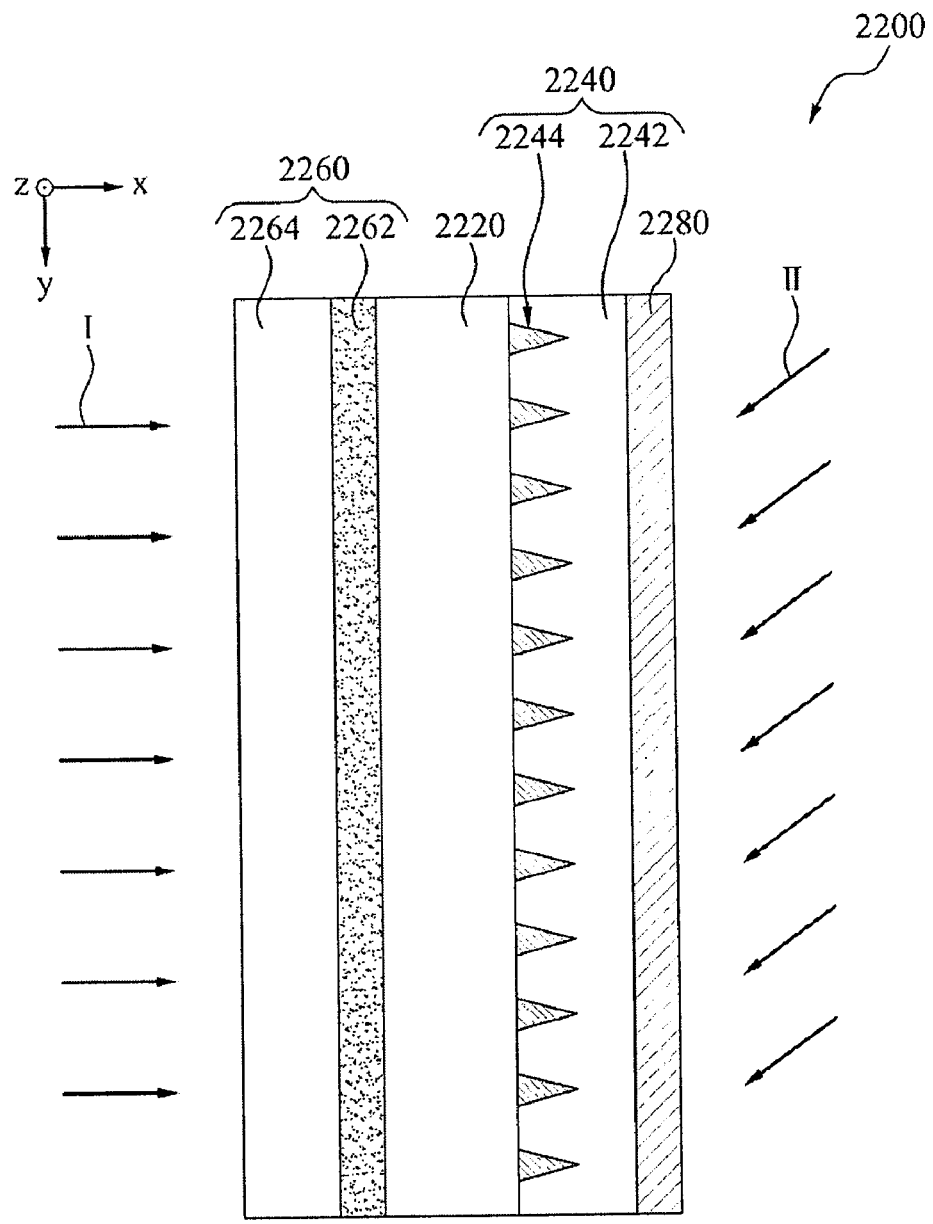
FIG. 22 is a cross-sectional diagram illustrating an optical filter for a display apparatus according to another exemplary embodiment of the present invention.

FIG. 22 is a cross-sectional diagram illustrating an optical filter 2200 for a display apparatus according to another exemplary embodiment of the present invention.

Referring to FIG. 22, the optical filter 2200 includes a transparent substrate 2220, an external light shielding film 2240, a color compensation multi-layered member 2260, and an anti-reflection film 2280. The external light shielding film 2260 is disposed on a surface of the transparent substrate 2220, and the color compensation multi-layered member 2260 is disposed on another surface of the transparent substrate 2220. According to the present exemplary embodiment of the invention, the color compensation multi-layered member 2260 includes a birefringent thin layer 2262 and a first thick layer 2264. In this instance, the transparent substrate 2220 may act as the thick layer. Since a refractive index of a tempered glass is about 1.5 in a case of use of the tempered glass for the transparent substrate 2220, the transparent substrate 2220 may act as the thick layer having a low refractive index. In this case, the manufacture cost and a thickness of the filter may be significantly reduced. Also, according to another exemplary embodiment of the invention, a PSA may be used as the transparent substrate 2220 or the first thick layer 2264, and the PSA may be directly adhered on the display panel in a case where the transparent substrate is a soft plastic substrate and the first thick layer is the PSA. In this case, the manufacture cost and a thickness of the display set may be significantly reduced. According to the present exemplary embodiment, a difference between a second refractive index of a direction (y-direction in FIG. 22) parallel to a surface of the birefringent thin layer 2262 and a third refractive index of the first thick layer should be 1 or less. The repeated descriptions of the transparent substrate 2220, external light shielding film 2240, and anti-reflection film 2280 will be herein omitted.

Figure 23:
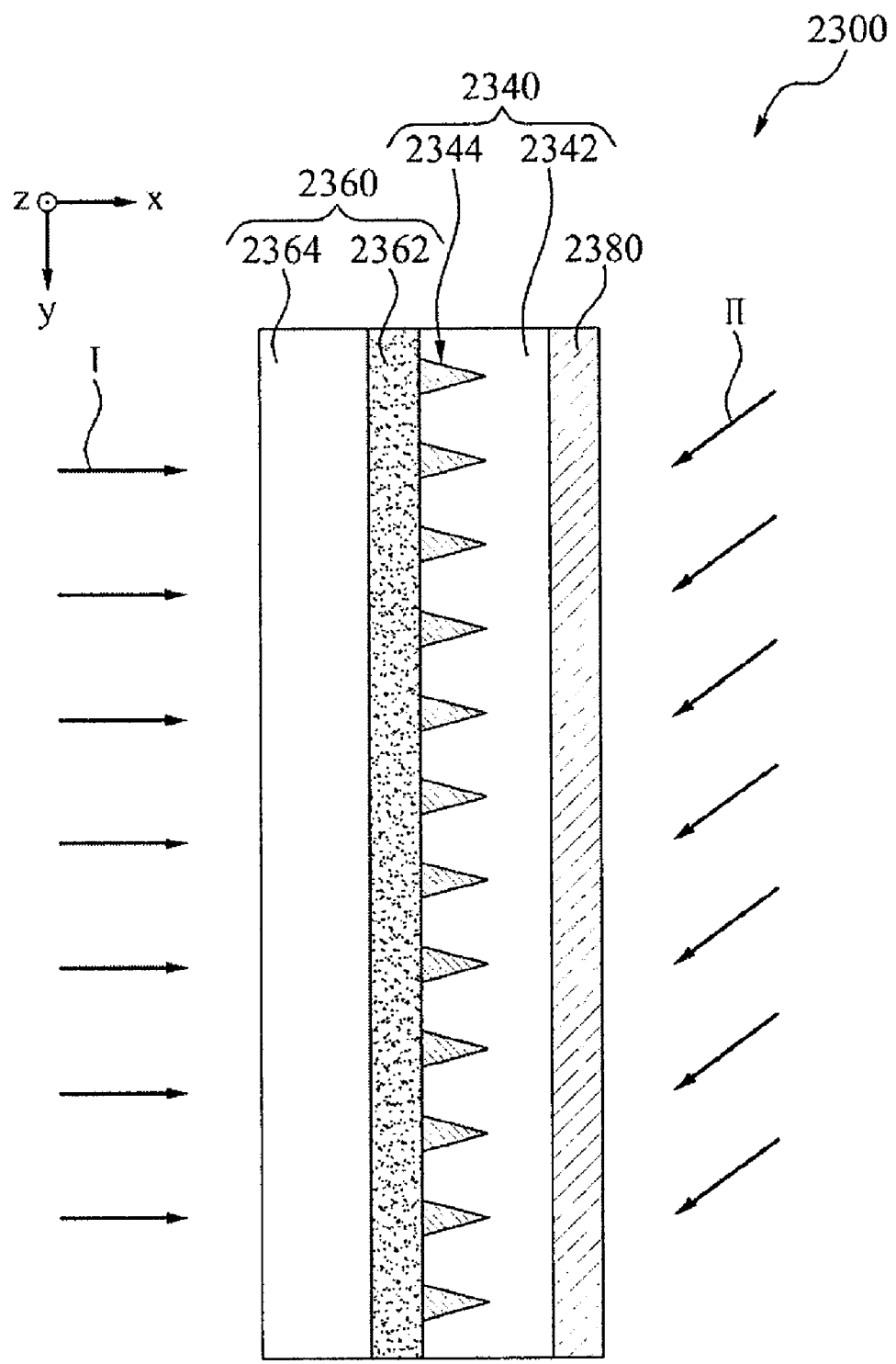
FIG. 23 is a cross-sectional diagram illustrating an optical filter for a display apparatus according to another exemplary embodiment of the present invention.

FIG. 23 is a cross-sectional diagram illustrating an optical filter 2300 for a display apparatus according to another exemplary embodiment of the present invention.

Referring to FIG. 23, the optical filter 2300 includes an external light shielding film 2340, a color compensation multi-layered member 2360, and an anti-reflection film 2380. The color compensation multi-layered member 2360 is disposed in a surface of the external light shielding film 2340, and the anti-reflection film 2380 is disposed on another surface of the external light shielding film 2340. According to the present exemplary embodiment of the invention, the color compensation multi-layered member 2360 includes a birefringent thin layer 2362, and a first thick layer 2364. In this instance, the external light shielding film 2340 may act as a thick layer. According to another exemplary embodiment of the invention, a PSA may be used as the first thick layer 2264, and the external light shielding film 2340 may act as the transparent substrate. In this instance, the PSA may be directly adhered on the display panel. In this case, the manufacture cost and a thickness of the display set may be significantly reduced. According to the present exemplary embodiment of the invention, a difference between a second refractive index of a direction (y-direction in FIG. 23) parallel to a surface of the birefringent thin layer 2362 and a third refractive index of the first thick layer should be 1 or less. The repeated descriptions of the external light shielding film 2340, the color compensation multi-layered member 2360, and the anti-reflection film 2380 will be herein omitted.

Figure 24:
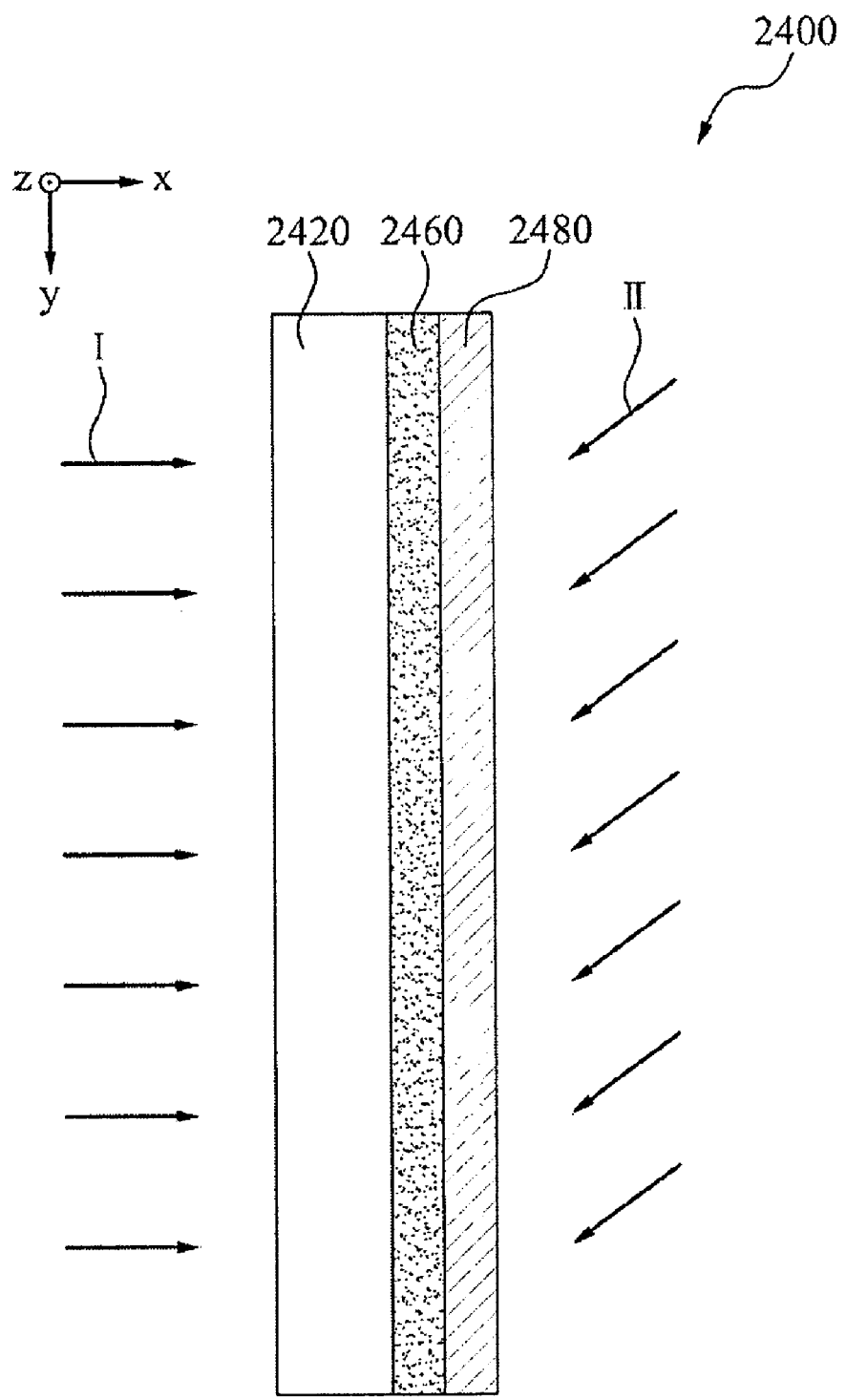
FIG. 24 is a cross-sectional diagram illustrating an optical filter for a display apparatus according to another exemplary embodiment of the present invention.

FIG. 24 is a cross-sectional diagram illustrating an optical filter 2400 for a display apparatus according to another exemplary embodiment of the present invention.

Referring to FIG. 24, the optical filter 2400 includes a birefringent thin layer 2460, a thick layer 2420, and an anti-reflection film 2480. The thick layer 2420 is disposed in a surface of the birefringent thin layer 2460, and the anti-reflection film 2480 is disposed in another surface of the birefringent thin layer 2460. The anti-reflection film 2480 may act as the thick layer. According to the present exemplary embodiment of the invention, a difference between a second refractive index of a direction (y-direction in FIG. 24) parallel to a surface of the birefringent thin layer 2460 and a third refractive index of the first thick layer should be 1 or less. The thick layer 2420 may be a PSA, and thus directly adhered on the display panel. In this case, the manufacture cost and a thickness of the display set may be significantly reduced. The repeated descriptions of the birefringent thin layer 2460, the thick layer 2420, and the anti-reflection film 2480 will be herein omitted.

Also, although not shown, according to another exemplary embodiment of the invention, the first thick layer may be disposed on a surface of the birefringent thin layer 2460, and either the second thick layer or the transparent substrate may be disposed on another surface of the birefringent thin layer. The birefringent thin layer may have a low refractive index, and the first and second thick layers may have a high refractive index. Contrarily, the birefringent thin layer may have a high refractive index, and the first and second refractive indexes may have a low refractive index. In this case, a refractive index (Ny) of a y-axis direction of the birefringent thin layer and a refractive index (Nx=Nz) of a x-axis or z-axis direction thereof are different from each other, and a difference between Ny and Nz should be 1 or less. The optical filter for the display apparatus including the above-described color compensation multi-layered member may reduce the color change according to the viewing angle, and also reduce the reflection of the external light.

As described above, the optical filter according to the present exemplary embodiment of the invention may include the birefringent thin layer between two thick layers, and function to adjust a magnitude of the refractive index of the birefringent thin layer and thick layer, and a transmittance according to the wavelength through the thickness of the thin layer, thereby performing color correction function and reflection prevention function. Also, the external light shielding film may be formed on a surface of the thick layer of the viewer side of the two thick layers, thereby reducing color change according to a vertical viewing angle and reducing reflectivity of the external light, and thus improving a contrast ratio in a bright room and image quality of the display. The optical filter according to the present exemplary embodiment of the invention as described above may be preferably disposed on a front surface of the display panel in a direction facing a viewer for the purpose of color correction with respect to color image entering from the display panel in the display apparatus. However, the present invention is not limited thereto, and thus the optical filter may be disposed apart from the front surface of the display panel, or directly adhered on the display panel. Also, the optical filter may be disposed between a backlight unit (BLU) of a Liquid Crystal Display (LCD) and the display panel.

Hereinafter, a display apparatus capable of adopting the optical filter for the display apparatus according to the present invention will be described in detail.

Figure 20:
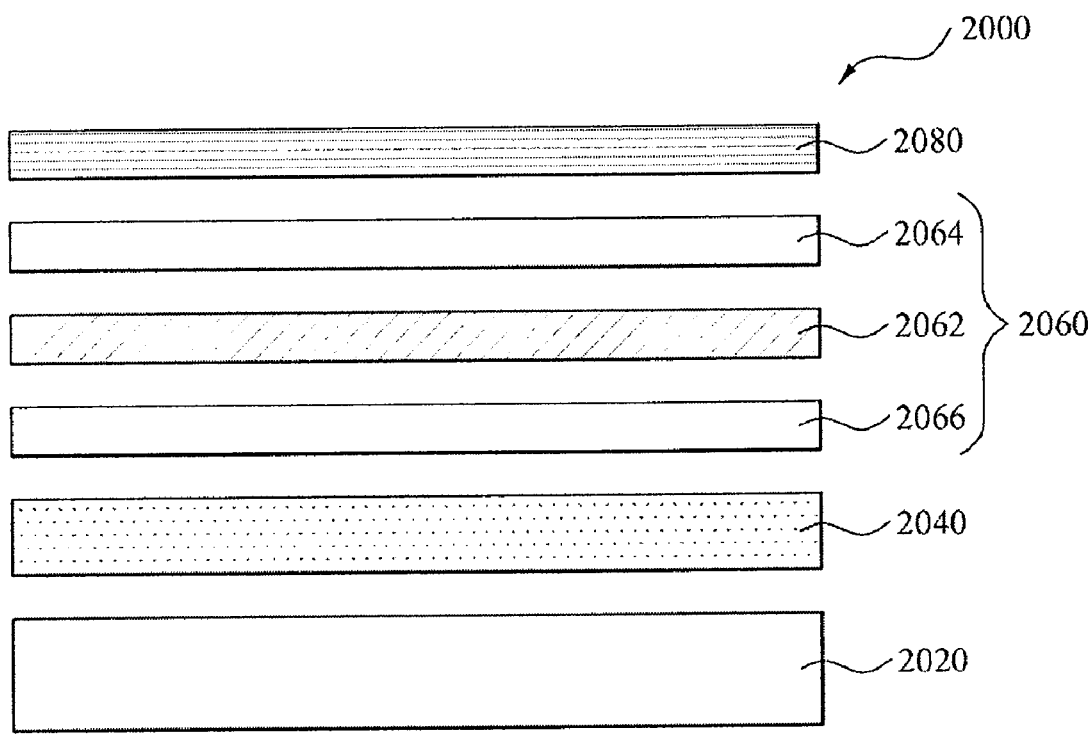
FIG. 20 is a schematic cross-sectional diagram illustrating a structure of a display apparatus according to an exemplary embodiment of the present invention.

FIG. 20 is a schematic cross-sectional diagram illustrating a structure of a LCD apparatus 2000 of a display apparatus according to an exemplary embodiment of the present invention. Referring to FIG. 20, the LCD apparatus 2000 includes a backlight assembly 2020, a first optical filter 2040, a panel assembly 2060, and a second optical filter 2080. The backlight assembly 2020 includes an edge type, a flat type, and the like, and the backlight assembly 2020 of the edge type may include a light guide plate. The first optical filter 2040 may include various functional layers such as a light-converging sheet converging a light emitted from the backlight, a diffusion sheet diffusing a light, and the like. The panel assembly 2060 includes an upper substrate 2064, a lower substrate 2066, and a liquid crystal layer 2062. The liquid crystal layer 2062 may be disposed between the upper and lower substrates 2064 and 2066, and display color image.

The second optical filter 2080 corresponds to the optical filter for the display apparatus according to the present exemplary embodiment of the invention, and may be constructed such that a thin layer is disposed between two thick layers as illustrated in FIGS. 7, 14, and 15. The second optical filter 2080 may function to adjust a transmittance according to wavelength ranges differing by the thickness of the thin layer, and also according to the difference in the refractive index between the thick layer and the thin layer. As described above, the optical filter for the display apparatus according to the present exemplary embodiment of the invention may be preferably disposed on a front surface of the display panel in a direction facing a viewer for the purpose of color correction with respect to color images entering from the display panel in the display apparatus. However, the present invention is not limited thereto, and thus the optical filter may be disposed apart from the front surface of the display panel, or directly adhered on the display panel. Also, the optical filter may be disposed between a backlight unit (BLU) of a LCD and the display panel.

More specifically, the second optical filter 2080 may include a lower thick layer disposed on the panel assembly 2060, a thin layer formed on the lower thick layer, and an upper thick layer formed on the thin layer, or include only the upper thick layer and the thin layer. In the latter case, the upper substrate 2064 of the panel assembly 2060 may act as the lower thick layer.

According to another exemplary embodiment of the invention, an air layer of the second optical filter 2080 may act as the upper thick layer without forming the upper thick layer. Specifically, the second optical filter 2080 may be formed on the upper substrate 2064 or the lower thick layer having a low refractive index, and may be constructed only with the thin layer having a greater refractive index than the lower thick layer. Accordingly, the thin layer may be exposed to the air, and act as the upper thick layer where the air layer on the thin layer has a low refractive index.

According to another exemplary embodiment of the invention, the lower thick layer and the thin layer may be stacked on the liquid crystal layer 2062 in the stated order, and the upper substrate 2064 may be formed on the thin layer, and thereby the upper substrate 2064 may act as the upper thick layer.

As described above, a specific configuration of the second optical filter 2080 may be realized in various exemplary embodiments, and the present invention is not limited thereto. Through the configuration of the second optical filter or a combined configuration of the second optical filter 2080 and the panel assembly 2060, results obtained by disposing a layer having a low refractive index between two layers having a high refractive index, or disposing the layer having the high refractive index between two layers having the low refractive index may be the same or similar with each other. Specifically, the use of the multi-layers having the above-described structure may reduce color change according to the viewing angle.

Hereinafter, the optical filter for the display apparatus including the color compensation multi-layered member according to the present invention may be adhered on a front surface of a LCD panel, and therefore results obtained by measuring the transmittance and color change may be shown.

Measured Result 1

As shown in FIG. 7, the thin layer 742 is disposed between the first thick layer 744 and the second thick layer 746, thereby designing a color compensation multi-layered member 740. Each refractive index of the first and second thick layers 744 and 746 is 2.5, and the thickness thereof is 1 mm. A refractive index of the thin layer 742 is 1.5, and the thickness thereof is 190 nm.

Figure 11:
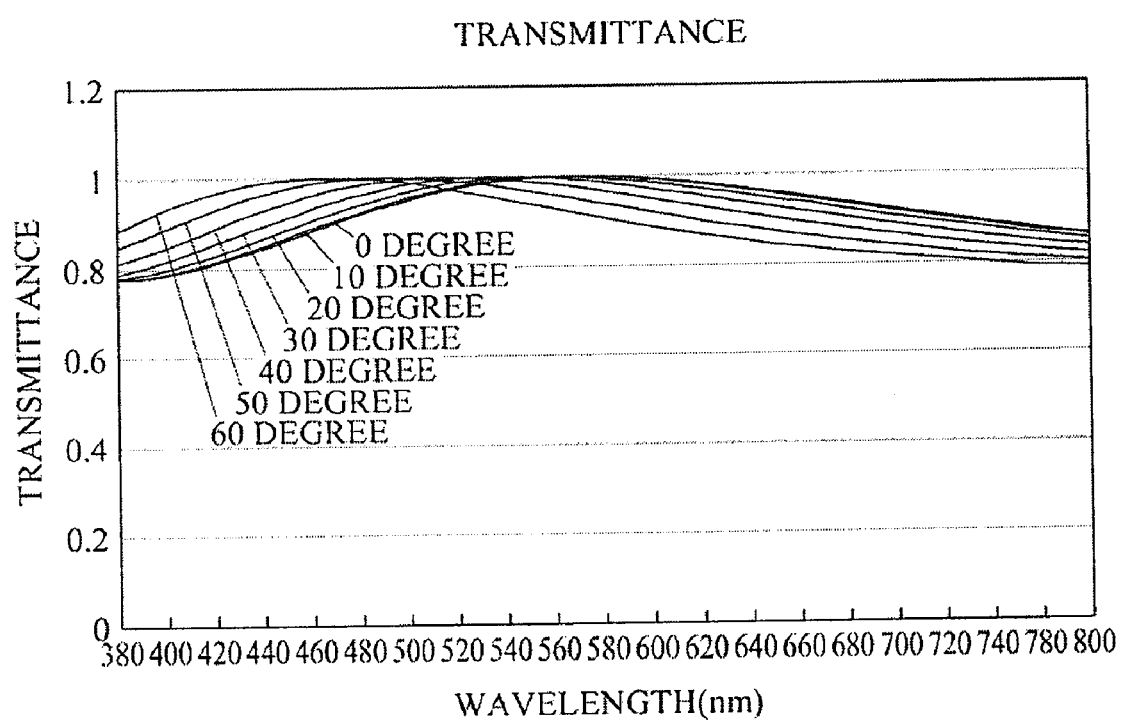
FIG. 11 is a graph illustrating a transmittance depending on change in a viewing angle of a color compensation multi-layered member for a display apparatus according to an exemplary embodiment of the present invention.

FIG. 11 is a graph illustrating a transmittance depending on change in a viewing angle of the color compensation multi-layered member 740. Along with an increase in the viewing angle, the transmittance increases in a part range (380 nm to 460 nm) of the blue light wavelength, and decreases in a part range (540 nm to 780 nm) of the green and red light wavelengths. Accordingly, as described above, a degree of abrupt reduction in spectrum strength occurring in the blue wavelength along with the increase in the viewing angle is lessened, and a degree of reduction in spectrum strength occurring in the green and red wavelength is increased, and thereby the degree of reduction in the spectrum strength along with the increase in the viewing angle over the entire visible ray wavelength range may be adjusted to be the same or similar with each other.

Also, in the color compensation multi-layered member 740, a ratio of the minimum transmittance to the maximum transmittance within the entire visible ray wavelength range of 380 to 780 nm is from 0.7 to 0.9. Specifically, as shown in FIG. 11, when the maximum transmittance within the entire wavelength range is 1, the minimum transmittance is about 0.8.

Figure 12:
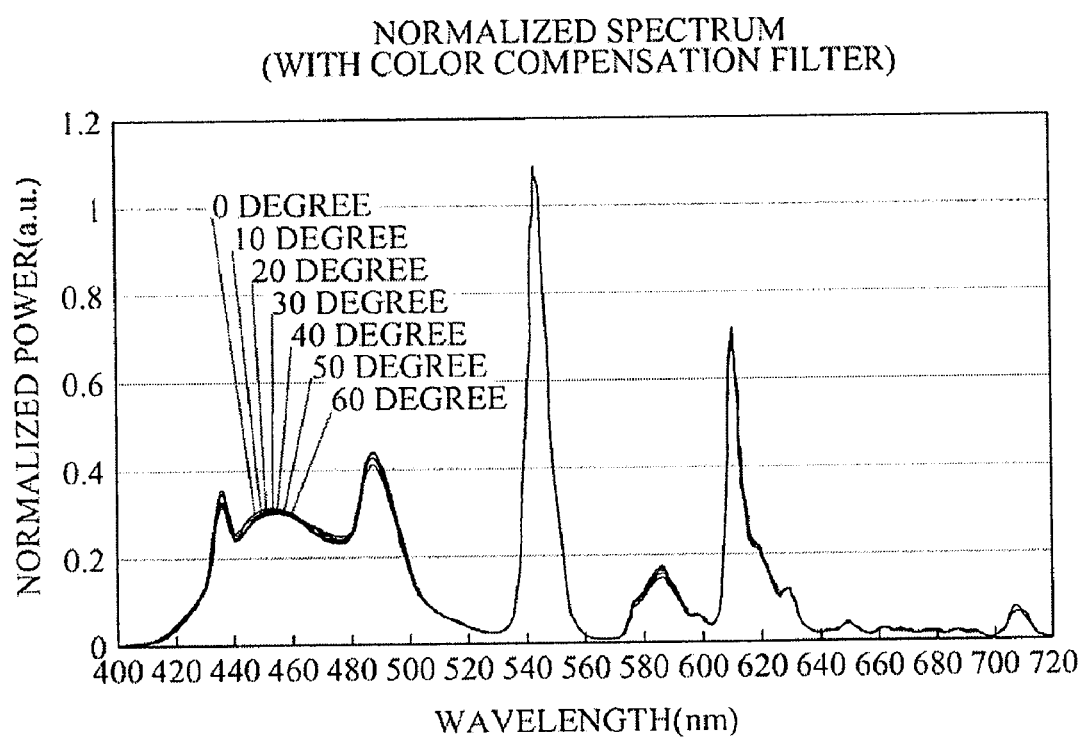
FIG. 12 is a graph obtained by normalizing results of an LCD spectrum adopting the results of FIG. 11.

FIG. 12 shows the change of the spectrum strength normalized according to the increase in the viewing angle of the color compensation multi-layered member 740. As can be seen in FIG. 12, the degree of the reduction in the spectrum strength according to the increase in the viewing angle is nearly the same over the entire wavelength range as well as the blue light wavelength range. This result shows that the color change depending on the increase in the viewing angle is nearly disappeared.

Figure 13:
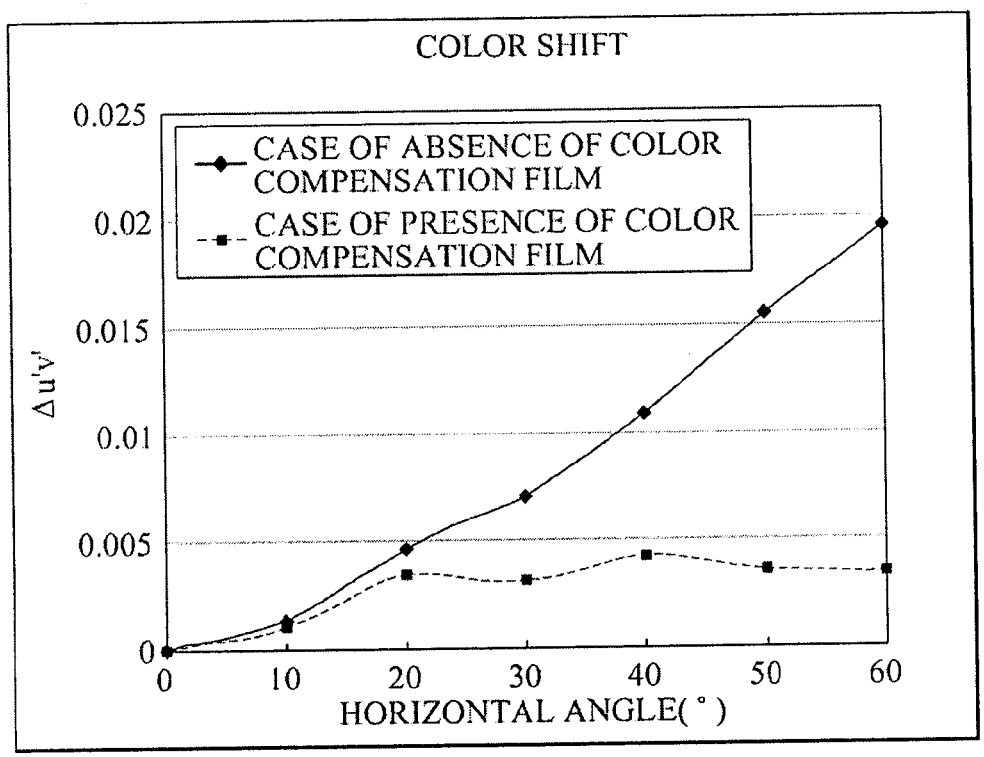
FIG. 13 is a graph illustrating change in color coordinate depending on an increase in a viewing angle of a color compensation multi-layered member for a display apparatus according to an exemplary embodiment of the present invention.

FIG. 13 is a graph illustrating change ($\Delta u'v'$) in the color coordinate (CIE 1976 L u'v') depending on the increase in the viewing angle. A horizontal axis of the FIG. 13 denotes a horizontal angle, that is, the viewing angle. As can be seen in FIG. 13, an amount of the color change in the case of presence of the color compensation multi-layered member is significantly reduced in comparison with the case of absence of the color compensation multi-layered member.

Measured Result 2

As shown in FIG. 14, the thin layer 1442 is disposed between the first thick layer 1444 and the second thick layer 1446, thereby manufacturing the color compensation multi-layered member 1440. Each refractive index of the first and second thick layers 1444 and 1446 is 1.5, and the thickness thereof is 2 mm. A refractive index of the thin layer 1442 is 2.5, and the thickness is 209 nm.

Figure 16:
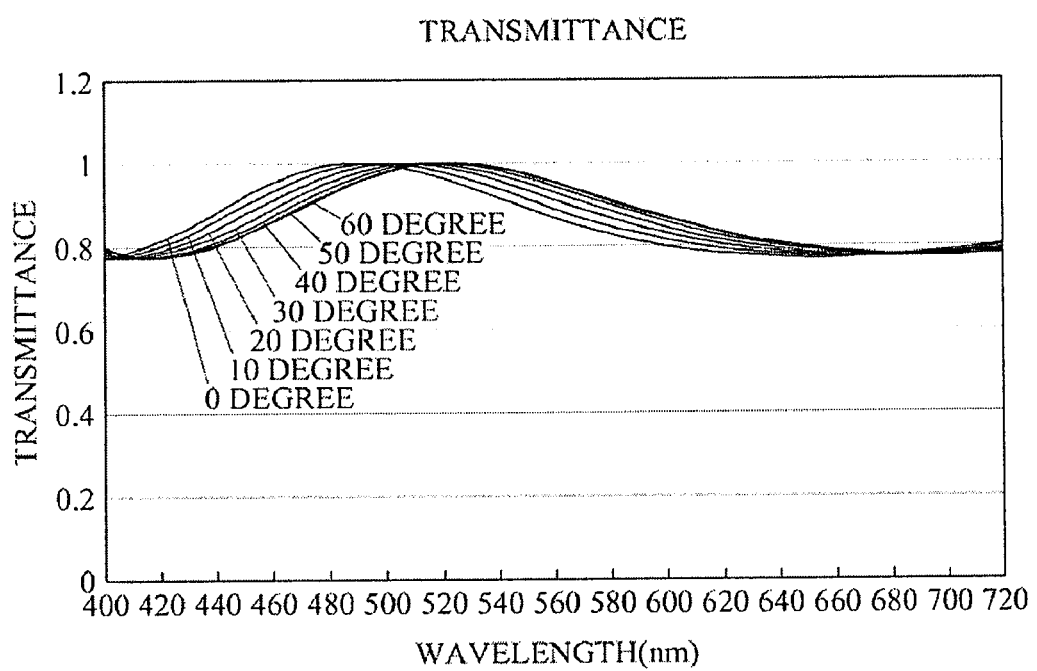
FIG. 16 is a graph illustrating a transmittance depending on change in a viewing angle of a color compensation multi-layered member for a display apparatus according to another exemplary embodiment of the present invention.

FIG. 16 is a graph illustrating a transmittance depending on the change in the viewing angle of the color compensation multi-layered member 1440. Along with an increase in the viewing angle, the transmittance increases in a part range (420 nm to 460 nm) of the blue light wavelength, and decreases in a part range (520 nm to 660 nm) of the green and red light wavelengths. Accordingly, as described above, a degree of abrupt reduction in spectrum strength occurring in the blue wavelength along with the increase in the viewing angle is lessened, and a degree of reduction in spectrum strength occurring in the green and red wavelength is increased, and thereby the degree of reduction in the spectrum strength along with the increase in the viewing angle over the entire visible ray wavelength range may be adjusted to be the same or similar with each other. Similarly, in the color compensation multi-layered member 1440, a ratio of the minimum transmittance to the maximum transmittance within the entire visible ray wavelength range of 380 to 780 nm is from 0.7 to 0.9. Specifically, as shown in FIG. 16, when the maximum transmittance within the entire wavelength range is 1, the minimum transmittance is from 0.7 to 0.9.

Figure 17:
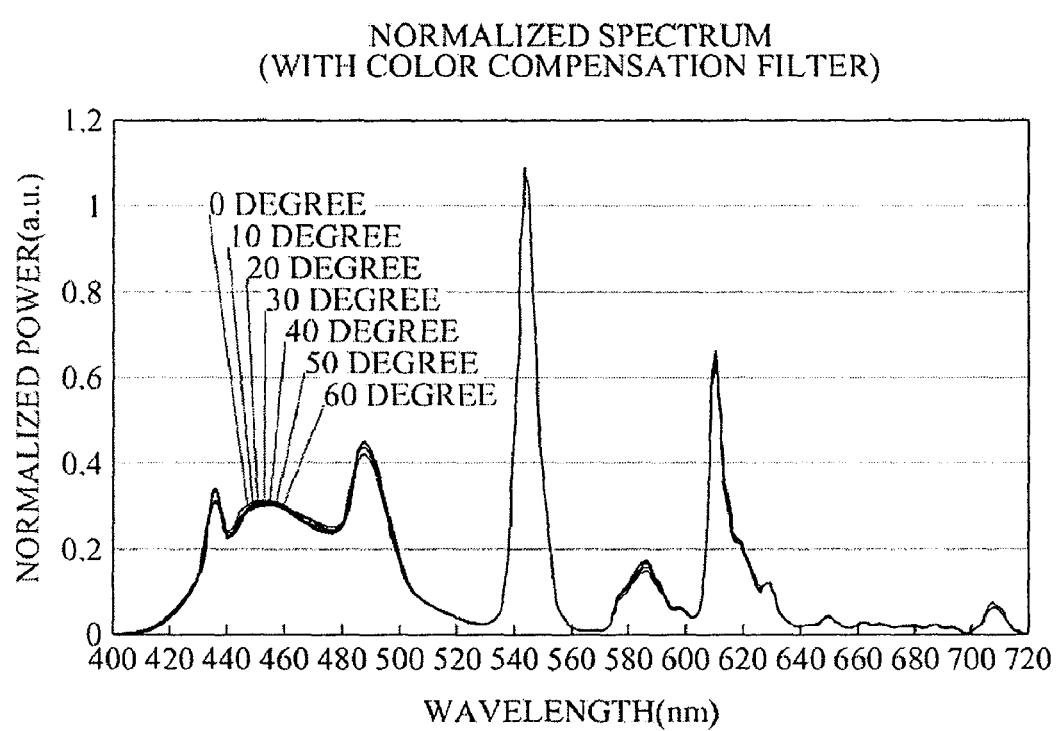
FIG. 17 is a graph obtained by normalizing results of an LCD spectrum adopting the results of FIG. 16.

FIG. 17 shows the change in the spectrum strength normalized according to the increase in the viewing angle of the color compensation multi-layered member 740. As can be seen in FIG. 17, the degree of the reduction in the spectrum strength according to the increase in the viewing angle is nearly the same over the entire wavelength range as well as the blue light wavelength range. This result shows that the color change depending on the increase in the viewing angle is nearly disappeared.

Figure 18:
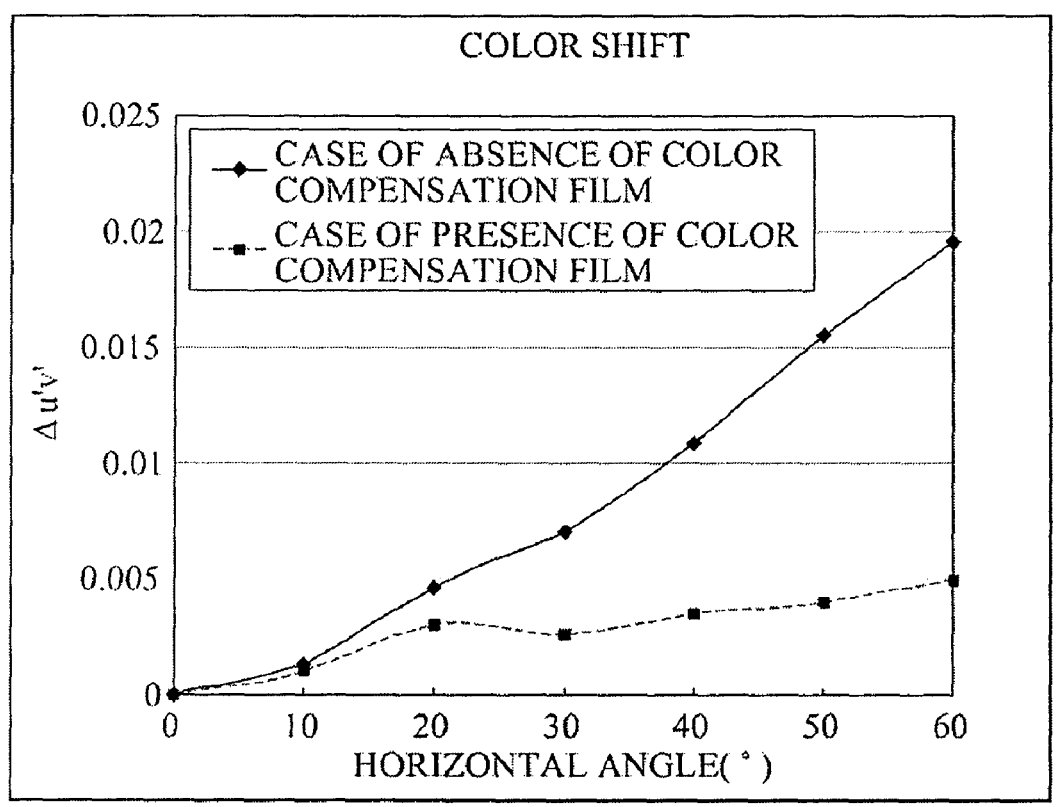
FIG. 18 is a graph illustrating change in color coordinate depending on an increase in a viewing angle of a color compensation multi-layered member for a display apparatus according to another exemplary embodiment of the present invention.

FIG. 18 is a graph illustrating change ($\Delta u'v'$) in the color coordinate (CIE 1976 L u'v') depending on the increase in the viewing angle. A horizontal axis of the FIG. 18 denotes a horizontal angle, that is, the viewing angle. As can be seen in FIG. 18, an amount of the color change in the case of presence of the color compensation multi-layered member is significantly reduced in comparison with the case of absence of the color compensation multi-layered member.

Measured Result 3

The above-described measured results show results obtained by measuring the color compensation multi-layered member for improving a case where the degree of reduction in the spectrum strength depending on the increase in the viewing angle is relatively greater in the blue light wavelength. Contrarily, a LCD where the degree of reduction in the spectrum strength depending on the increase in the viewing angle is relatively greater in the red light wavelength may exist. However, even in this case, the manufacture of a suitable color compensation multi-layered member according to the present invention may be possible.

As shown in FIG. 14, the thin layer 1442 is disposed between the first thick layer 1444 and the second thick layer 1446, thereby manufacturing the color compensation multi-layered member 1440. Each refractive index of the first and second thick layers 1444 and 1446 is 1.5, and the thickness thereof is 2 mm. A refractive index of the thin layer 1442 is 2.5, and the thickness is 170 nm.

Figure 19:
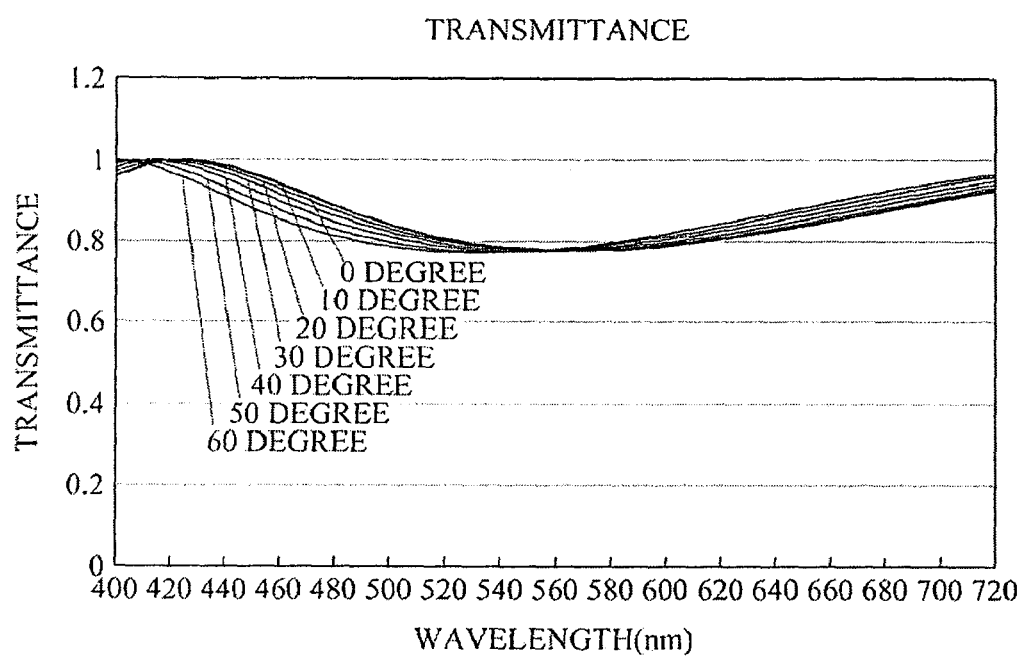
FIG. 19 is a graph illustrating a transmittance depending on change in a viewing angle of a color compensation multi-layered member for a display apparatus according to another exemplary embodiment of the present invention.

FIG. 19 is a graph illustrating a transmittance depending on the change in the viewing angle of the color compensation multi-layered member 1440. Along with an increase in the viewing angle, the transmittance increases in a part range (600 nm to 700 nm) of the red light wavelength, and decreases in a part range (420 nm to 480 nm) of the blue light wavelength. Accordingly, as described above, a degree of abrupt reduction in spectrum strength occurring in the red wavelength along with the increase in the viewing angle is lessened, and a degree of reduction in spectrum strength occurring in the green and blue wavelength is increased, and thereby the degree of reduction in the spectrum strength along with the increase in the viewing angle over the entire visible ray wavelength range may be adjusted to be the same or similar with each other. Similarly, in the color compensation multi-layered member 1440, a ratio of the minimum transmittance to the maximum transmittance within the entire visible ray wavelength range of 380 to 780 nm is from 0.7 to 0.9. Specifically, as shown in FIG. 16, when the maximum transmittance within the entire wavelength range is 1, the minimum transmittance is from 0.7 to 0.9.

Also, even in the case where the refractive index of the thick layer is greater than that of the thin layer, each refractive index and the thickness of the thin layer may be adjusted, thereby obtaining the same effects as the above.

Measured Result 4

Figure 25:
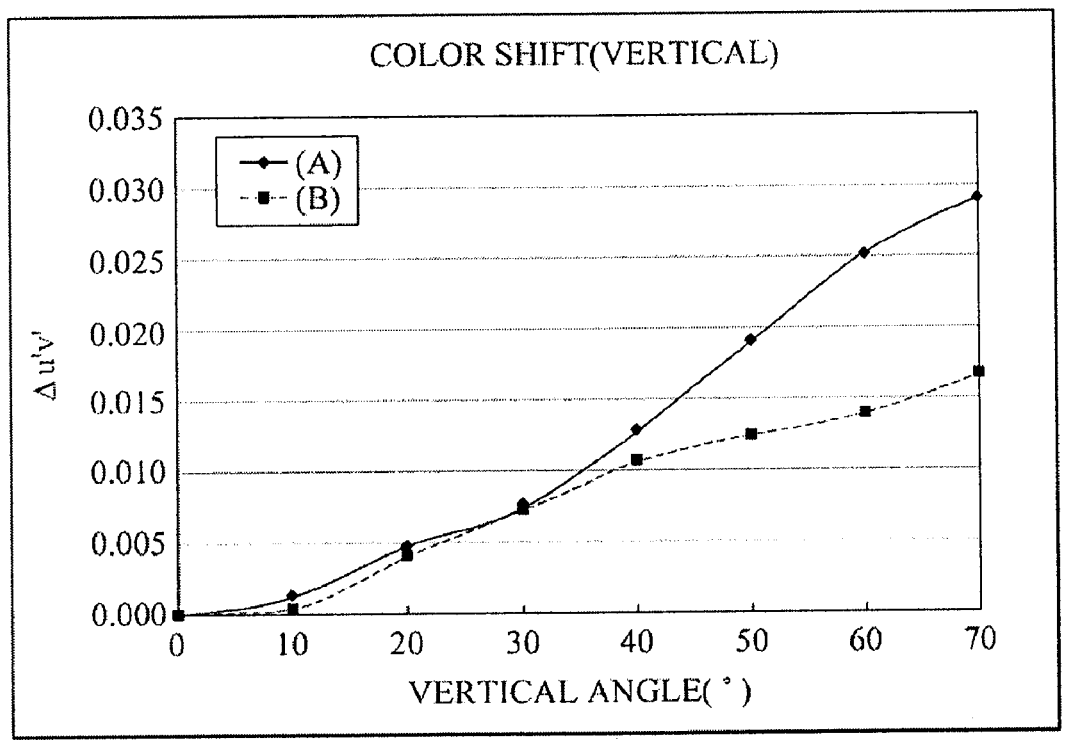
FIG. 25 is a graph illustrating change in color coordinate depending on an increase in a vertical viewing angle of a color compensation multi-layered member for a display apparatus according to another exemplary embodiment of the present invention.

FIG. 25 is a graph illustrating change ($\Delta u'v'$) in the color coordinate (CIE 1976 L u'v') depending on an increase in a vertical viewing angle in a case where the external light shielding film is additionally included in the display panel. A horizontal axis of the FIG. 25 denotes a vertical angle, that is, an upper or lower portion angle deviated from a middle portion of a display screen. (A) of FIG. 25 is a result obtained by measuring the optical filter not including the external light shielding film, and (B) of FIG. 25 is a result obtained by measuring the optical filter including the external light shielding film.

As can be seen in FIG. 25, the change in the color coordinate in a horizontal direction according to the presence and absence of the external light shielding film is not nearly shown, however, the change in the color coordinate in a vertical direction is significantly shown. Accordingly, the color change depending on the vertical viewing angle according to the use of the color compensation multi-layered member including the birefringent thin layer may be compensated by using the external light shielding film.

Meanwhile, when even the optical filter including the color compensation multi-layered member using a single refraction thin layer different from the birefringent thin layer further includes the external light shielding film, a contrast ratio in a bright room may be increased due to the external light shielding effect, and the reflection of the external light may be reduced.

As described above, according to the present invention, there is provided the color compensation multi-layered member for the display apparatus which may lessen a degree of the reduction in the spectrum strength of a specific wavelength range depending on an increase in the viewing angle, so that the degree of the reduction in the spectrum strength with respect to the entire visible ray wavelength range is the same or similar with each other, thereby reducing the color change, and further improving the image quality.

According to the present invention, there is provided the color compensation multi-layered member for the display apparatus which may reduce a difference of the refractive index between the thick layer and the thin layer, thereby reducing the reflection of the external light on the interface of the thick and thin layers.

According to the present invention, there is provided the external light shielding film of the color compensation multi-layered member for the display apparatus which may absorb the external light, thereby additionally reducing the reflection of the external light, and complementing a reduction in color compensation effects due to the use of the birefringent thin layer.

According to the present invention, there is provided the optical filter for the display apparatus which prevent external impact and reflection of the external light, and significantly reduce the color change according to the change in the viewing angle.

According to the present invention, there is provided the display apparatus which reduce the color change according to the change in the viewing angle, thereby displaying superior color images.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A color compensation multi-layered member for a display apparatus, the color compensation multi-layered member comprising:
   a thin layer having a thickness of about 780 nm or less and a first refractive index;
   a first thick layer having a greater thickness than the thin layer, the first thick layer being disposed directly on a surface of the thin layer and having a second refractive index; and
   a second thick layer having a greater thickness than the thin layer, the second thick layer being disposed directly on another surface of the thin layer and having a third refractive index,
   wherein the thickness of the first thick layer is about 780 nm or more and the thickness of the second thick layer is about 780 nm or more.

2. The color compensation multi-layered member of claim 1, wherein the first refractive index is less than the second and third refractive indexes.

3. The color compensation multi-layered member of claim 2, wherein the first refractive index is from 1 to 2, and the second and third refractive indexes are from 2 to 4.

4. The color compensation multi-layered member of claim 1, wherein the first refractive index is greater than the second and third refractive indexes.

5. The color compensation multi-layered member of claim 4, wherein the first refractive index is from 2 to 4, and the second and third refractive indexes are from 1 to 2.

6. The color compensation multi-layered member of claim 1, wherein a difference between the second and third refractive indexes is 1 or less, or the second and third refractive indexes are the same.

7. The color compensation multi-layered member of claim 1, wherein the thickness of the first thick layer is about 5 mm or less and the thickness of the second thick layers is 5 mm or less.

8. The color compensation multi-layered member of claim 1, wherein a thickness (l) and refractive index (n) of the thin layer, and a reflectivity (R) on an interface of the first thick layer and thin layer are adjusted, so that a mean value of a transmittance (T) according to the following Equation 1 and Equation 2 is maximized with respect to a blue light region having a wavelength (λ) of about 380 to 500 nm:

$$T=(1-R)^2/(1+R^2-2R\cos\delta)$$ [Equation 1]

$$\delta=(2\pi/\lambda)2nl\cos\theta \ (0°\leq\theta\leq80°),$$ [Equation 2]

wherein δ is a phase difference between a first light and a second light both traveling across the second thick layer, the first light having traveled across the thin layer without reflection before entering the second thick layer, the second light having been reflected in the thin layer before entering the second thick layer, and θ is a refraction angle of the first light traveling across the thin layer.

9. The color compensation multi-layered member of claim 1, wherein a transmittance of a light in a blue light region having a wavelength of about 380 to 500 nm increases as an incident angle of the light increases from 0° to 80°.

10. The color compensation multi-layered member of claim 1, wherein a transmittance of a light in either of a green light region and red light region each having a wavelength of about 500 to 780 nm decreases as an incident angle of the light increases from 0° to 80°.

11. The color compensation multi-layered member of claim 1, wherein a ratio of a minimum transmittance of a light with a wavelength of about 380 to 780 nm to a maximum transmittance of a light with a wavelength of about 380 to 780 nm is about 0.5 to 0.9.

12. The color compensation multi-layered member of claim 1, wherein at least one of the first and second thick layers is selected from a glass, a Pressure Sensitive Adhesive (PSA), a transparent resin film, or an anti-reflection film.

13. The color compensation multi-layered member of claim 1, further comprising an external light shielding film which comprises:
a substrate disposed on either the first thick layer or the second thick layer and including a transparent resin; and
external light shielding parts disposed on a surface of the substrate, the external light shielding parts including an engraving pattern having a wedge-shaped cross section and being filled with a light absorbing substance.

14. A display apparatus comprising:
a thin layer having a thickness of about 780 m or less and a first refractive index;
an external light shielding film as a first thick film having a greater thickness than the thin layer, and disposed directly on a surface of the thin layer, the first thick film having a second refractive index; and
a second thick layer having a greater thickness than the thin layer, and disposed directly on another surface of the thin layer, the second thick layer having a third refractive index,
wherein the thickness of the first thick layer is about 780 nm or more and the thickness of the second thick layer is about 780 nm or more, and
wherein the external light shielding film comprises a substrate including a transparent resin and having the second refractive index, and external light shielding parts disposed on a surface of the substrate, the external light shielding parts including an engraving pattern having a wedge-shaped cross section and being filled with a light absorbing substance.

15. A display apparatus, comprising:
a thin layer having a thickness of about 780 m or less and a first refractive index;
a Pressure Sensitive Adhesive (PSA) layer as a first thick layer having a greater thickness than the thin layer, the PSA layer being disposed directly on a surface of the thin layer and having a second refractive index;
a second thick layer having a greater thickness than the thin layer, the second thick layer being disposed directly on another surface of the thin layer and having a third refractive index; and
an external light shielding film disposed on a surface of the first thick layer facing away from the thin layer,
wherein the thickness of the first thick layer is about 780 nm or more and the thickness of the second thick layer is about 780 nm or more,
wherein the external light shielding layer comprises a substrate including a transparent resin, and external light shielding parts disposed on a surface of the substrate, the external light shielding parts including an engraving pattern having a wedge-shaped cross section and being filled with a light absorbing substance.

16. A color compensation multi-layered member for a display apparatus, the color compensation multi-layered member comprising:
a birefringent thin layer having a thickness of about 780 nm or less and having a first refractive index in x-axis and z-axis directions and a second refractive index in a y-axis direction;
a first thick layer having a greater thickness than the birefringent thin layer, the first thick layer being disposed directly on a surface of the birefringent thin layer and having a third refractive index; and
a second thick layer having a greater thickness than the birefringent thin layer, the second thick layer being disposed directly on another surface of the birefringent thin layer and having a fourth refractive index,
wherein the thickness of the first thick layer is about 780 nm or more and the thickness of the second thick layer is about 780 nm or more.

17. The color compensation multi-layered member of claim 16, wherein a difference between the second refractive index and the third refractive index is 1 or less, a difference between the second refractive index and the fourth refractive index is 1 or less, and the first refractive index is less than the third and fourth refractive indexes.

18. The color compensation multi-layered member of claim 17, wherein the first refractive index is from 1 to 2, and the third and fourth refractive indexes are from 2 to 4, respectively.

19. The color compensation multi-layered member of claim 16, wherein a difference between the second refractive index and the third refractive index is 1 or less, a difference between the second refractive index and the fourth refractive index is 1 or less, and the first refractive index is greater than the third and fourth refractive indexes.

20. The color compensation multi-layered member of claim 19, wherein the first refractive index is from 2 to 4, and the third and fourth refractive indexes are from 1 to 2, respectively.

21. The color compensation multi-layered member of claim 16, further comprising an external light shielding film, wherein the external light shielding film comprises:
a substrate disposed on either the first thick layer or the second thick layer, and including a transparent resin; and
external light shielding parts disposed on a surface of the substrate, the external light shielding parts including an engraving pattern having a wedge-shaped cross section and being filled with a light absorbing substance.

22. A display apparatus, comprising:
a birefringent thin layer having a thickness of about 780 nm or less and having a first refractive index in x-axis and z-axis directions and a second refractive index in a y-axis direction;
an external light shielding film as a first thick layer having a greater thickness than the birefringent thin layer, the first thick layer being disposed directly on a surface of the birefringent thin layer and having a third refractive index; and
a second thick layer having a greater thickness than the birefringent thin layer, the second thick layer being disposed directly on another surface of the birefringent thin layer and having a fourth refractive index,
wherein the thickness of the first thick layer is about 780 nm or more and the thickness of the second thick layer is about 780 nm or more, and
wherein the external light shielding film comprises a substrate including a transparent resin and having the third refractive index, and external light shielding parts disposed on a surface of the substrate, the external light shielding parts including an engraving pattern having a wedge-shaped cross section and being filled with a light absorbing substance.

23. A display apparatus comprising,
a birefringent thin layer having a thickness of about 780 nm or less, and having a first refractive index in x-axis and z-axis directions and a second refractive index in a y-axis direction;
a Pressure Sensitive Adhesive (PSA) layer as a first thick layer having a greater thickness than the birefringent thin layer, the first thick layer being disposed directly on a surface of the birefringent thin layer and having a third refractive index;
a second thick layer having a greater thickness than the birefringent thin layer, the second thick layer being disposed directly on another surface of the birefringent thin layer and having a fourth refractive index; and
an external light shielding film disposed on a surface of the first thick layer facing away from the birefringent thin layer,
wherein the thickness of the first thick layer is about 780 nm or more and the thickness of the second thick layer is about 780 nm or more,
wherein the external light shielding layer comprises a substrate including a transparent resin, and external light shielding parts disposed on a surface of the substrate, the external light shielding parts including an engraving pattern having a wedge-shaped cross section and being filled with a light absorbing substance.

24. An optical filter for a display apparatus, comprising:
a thin layer having a thickness of about 780 m or less and a first refractive index,
a first thick layer having a greater thickness than the thin layer, the first thick layer being disposed directly on a surface of the thin layer and having a second refractive index,
a transparent substrate as a second thick layer having a greater thickness than the thin layer, the second thick layer being disposed directly on another surface of the thin layer and having a third refractive index; and
an anti-reflection film disposed on a surface of the transparent substrate facing away from the thin layer,
wherein the thickness of the first thick layer is about 780 nm or more and the thickness of the second thick layer is about 780 nm or more.

25. An optical filter for a display apparatus, comprising:
a thin layer having a thickness of about 780 m or less and a first refractive index;
a first thick layer having a greater thickness than the thin layer, the first thick layer being disposed directly on a surface of the thin layer and having a second refractive index;
a second thick layer having a greater thickness than the thin layer, the second thick layer being disposed directly on another surface of the thin layer and having a third refractive index;
a transparent substrate disposed on a surface of the second thick layer facing away from the thin layer; and
an anti-reflection film disposed on a surface of the transparent substrate facing away from the second thick layer,
wherein the thickness of the first thick layer is about 780 nm or more and the thickness of the second thick layer is about 780 nm or more.

26. The optical filter of claim 24, wherein the transparent substrate includes a tempered glass.

27. The optical filter of claim 24, wherein a reflectivity of the anti-reflection film is less than 2%.

28. An optical filter for a display apparatus, the optical filter comprising:
a thin layer having a thickness of about 780 m or less and a first refractive index;
a first thick layer having a greater thickness than the thin layer, the first thick layer being disposed directly on a surface of the thin layer, and having a second refractive index; and
a transparent substrate as a second thick layer having a greater thickness than the thin layer, the second thick layer being disposed directly on another surface of the thin layer and having a third refractive index;
an external light shielding film disposed on a surface of the transparent substrate facing away from the thin layer, wherein the external light shielding film includes a substrate and external light shielding parts, the external light shielding parts being disposed on a surface of the substrate, and being filled with a light absorbing substance; and
an anti-reflection film disposed on a surface of the external light shielding film facing away from the transparent substrate and adapted to prevent reflection of an external light,
wherein the thickness of the first thick layer is about 780 nm or more and the thickness of the second thick layer is about 780 nm or more.

29. An optical filter for a display apparatus, comprising:
a thin layer having a thickness of about 780 m or less and a first refractive index;
a first thick layer having a greater thickness than the thin layer, the first thick layer being disposed directly on a surface of the thin layer and having a second refractive index;
a second thick layer having a greater thickness than the thin layer, the second thick layer being disposed directly on another surface of the thin layer and having a third refractive index;
a transparent substrate disposed on a surface of the second thick layer;
an external light shielding film disposed on a surface of the transparent substrate facing away from the second thick layer, the external light shielding film including a further substrate and external light shielding parts, the external light shielding parts being disposed on a surface of the substrate and being filled with a light absorbing substance; and an anti-reflection film disposed on a surface of the external light shielding film facing away from the transparent substrate and adapted to prevent reflection of an external light, wherein the thickness of the first thick layer is about 780 nm or more and the thickness of the second thick layer is about 780 nm or more.

30. An optical filter for a display apparatus, comprising:

a birefringent thin layer having a thickness of about 780 nm or less, the birefringent thin layer having a first refractive index in x-axis and z-axis directions and a second refractive index in a y-axis direction;

a first thick layer having a greater thickness than the birefringent thin layer, the first thick layer being disposed directly on a surface of the birefringent thin layer and having a third refractive index;

a transparent substrate as a second thick layer having a greater thickness than the birefringent thin layer, the second thick layer being disposed directly on another surface of the birefringent thin layer and having a fourth refractive index; and an anti-reflection film disposed on a surface of the transparent substrate facing away from the birefringent thin layer, wherein the thickness of the first thick layer is about 780 nm or more and the thickness of the second thick layer is about 780 nm or more.

31. An optical filter for a display apparatus, comprising:

a birefringent thin layer having a thickness of about 780 nm or less, the birefringent thin layer having a first refractive index in x-axis and z-axis directions and a second refractive index in a y-axis direction;

a first thick layer having a greater thickness than the birefringent thin layer, the first thick layer being disposed directly on a surface of the birefringent thin layer and having a third refractive index;

a second thick layer having a greater thickness than the birefringent thin layer, the second thick layer being disposed directly on another surface of the birefringent thin layer and having a fourth refractive index;

a transparent substrate disposed on a surface of the second thick layer facing away from the birefringent thin layer; and an anti-reflection film disposed on a surface of the transparent substrate facing away from the second thick layer, wherein the thickness of the first thick layer is about 780 nm or more and the thickness of the second thick layer is about 780 nm or more.

32. An optical filter for a display apparatus, the optical filter comprising:

a birefringent thin layer having a thickness of about 780 nm or less and having a first refractive index in x-axis and z-axis directions and a second refractive index in a y-axis direction;

a first thick layer having a greater thickness than the birefringent thin layer, the first thick layer being disposed directly on a surface of the birefringent thin layer and having a third refractive index;

a transparent substrate as a second thick layer having a greater thickness than the birefringent thin layer, the second thick layer being disposed directly on another surface of the birefringent thin layer and having a fourth refractive index;

an external light shielding film disposed on a surface of the transparent substrate facing away from the birefringent thin layer, the external light shielding film including a substrate and external light shielding parts, the external light shielding parts being disposed on a surface of the substrate and being filled with a light absorbing substance; and an anti-reflection film disposed on a surface of the external light shielding film facing away from the transparent substrate and adapted to prevent reflection of an external light, wherein the thickness of the first thick layer is about 780 nm or more and the thickness of the second thick layer is about 780 nm or more.

33. An optical filter for a display apparatus, comprising:

a birefringent thin layer having a thickness of about 780 nm or less and having a first refractive index in x-axis and z-axis directions and a second refractive index in a y-axis direction;

a first thick layer having a greater thickness than the birefringent thin layer, the first thick layer being disposed directly on a surface of the birefringent thin layer and having a third refractive index;

a second thick layer having a greater thickness than the birefringent thin layer, the second thick layer being disposed directly on another surface of the birefringent thin layer and having a fourth refractive index;

a transparent substrate disposed on a surface of the second thick layer facing away from the birefringent thin layer;

an external light shielding film disposed on a surface of the transparent substrate facing away from the second thick layer, the external light shielding film including a substrate and external light shielding parts, the external light shielding parts being disposed on a surface of the substrate and being filled with a light absorbing substance; and an anti-reflection film disposed on a surface of the external light shielding film facing away from the transparent substrate and adapted to prevent reflection of an external light, wherein the thickness of the first thick layer is about 780 nm or more and the thickness of the second thick layer is about 780 nm or more.

34. A display apparatus, comprising:

an upper substrate and a lower substrate each being made of a glass;

a panel assembly for the display apparatus, the panel assembly including a liquid crystal layer disposed between the upper and lower substrates; and the optical filter for the display apparatus of any one of claim 24, 28, or 30, the optical filter being arranged over the upper substrate.

35. A display apparatus, comprising:

an upper substrate and a lower substrate each being made of a glass; and a liquid crystal layer disposed between the upper substrate and the lower substrate, wherein a thin layer having a thickness of about 780 nm or less and a first refractive index is disposed between the upper substrate and the liquid crystal layer, a first thick layer having a greater thickness than the thin layer and a second refractive index is disposed directly on a surface of the thin layer, the upper substrate as a second thick layer having a greater thickness than the thin layer and a third refractive index is disposed directly on another surface of the thin layer and the thickness of the upper substrate is about 780 nm or more and the thickness of the first thick layer is about 780 nm or more.

* * * * *